US012744680B2

(12) United States Patent
Takeoka

(10) Patent No.: US 12,744,680 B2
(45) Date of Patent: Sep. 22, 2026

(54) INFORMATION PROCESSING APPARATUS, METHOD, AND SYSTEM

(71) Applicant: TOYOTA JIDOSHA KABUSHIKI KAISHA, Toyota (JP)

(72) Inventor: Koji Takeoka, Tokyo (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 158 days.

(21) Appl. No.: 18/732,763

(22) Filed: Jun. 4, 2024

(65) Prior Publication Data

US 2024/0414013 A1 Dec. 12, 2024

(30) Foreign Application Priority Data

Jun. 7, 2023 (JP) ................................ 2023-094248

(51) Int. Cl.
*H04L 9/32* (2006.01)
*H04L 9/08* (2006.01)

(52) U.S. Cl.
CPC .......... *H04L 9/3268* (2013.01); *H04L 9/0816* (2013.01)

(58) Field of Classification Search
CPC .. H04L 9/3268; H04L 9/0816; H04W 12/069; H04W 8/183; H04W 12/40
See application file for complete search history.

(56) References Cited

U.S. PATENT DOCUMENTS 11,039,298 B2 * 6/2021 Lee ......................... H04L 63/20
2014/0140507 A1 5/2014 Park et al.
2018/0176768 A1 * 6/2018 Baek ..................... H04W 8/205
2020/0092711 A1 * 3/2020 Chen ..................... H04W 8/205
2022/0070657 A1 3/2022 Aoki et al.
2023/0121282 A1 4/2023 Cunliffe
2023/0209340 A1 * 6/2023 Kang ...................... H04W 8/20
2023/0354040 A1 * 11/2023 Li ..................... H04W 12/0431
2025/0150830 A1 * 5/2025 Yoon ..................... H04W 12/43

FOREIGN PATENT DOCUMENTS

JP 2022-170250 A 11/2022
JP 2023-515277 A 4/2023
WO WO 2020/235626 A1 11/2020

* cited by examiner

*Primary Examiner* — Hany S. Gadalla

(74) *Attorney, Agent, or Firm* — Finnegan, Henderson, Farabow, Garrett and Dunner, LLP

(57) ABSTRACT

An information processing apparatus includes an eUICC that holds first profile information that is used for connection to a first communication system, and a processor configured to connect to the first communication system by using the first profile information. The processor acquires, from a predetermined certificate authority, a first electronic certificate that certifies that first authentication information that is used for authentication by a first server is for a first owner, stores the first authentication information and the first electronic certificate in the eUICC, and receives authentication by the first server by using the first authentication information and the first electronic certificate. A default profile is stored in the eUICC, and the information processing apparatus connects to the first communication system by using the default profile while the information processing apparatus is being sold as a new product or a used product.

9 Claims, 14 Drawing Sheets

FIG. 6

HSS SUBSCRIBER INFORMATION

| SUBSCRIBER ID (IMSI) | VEHICLE ID (IMEI) | SIM ID (EID) | PROFILE ID (ICCID) | MATCHING ID | DEFAULT | AUTHENTICATION INFORMATION | SETTINGS INFORMATION |
| --- | --- | --- | --- | --- | --- | --- | --- |
| | | | | | | | |

FIG. 7

HSS TERMINAL CONNECTION INFORMATION

| SUBSCRIBER ID (IMSI) | VEHICLE ID (IMEI) | AUTHENTICATION DATE/TIME | PROFILE ID (ICCID) |
|---|---|---|---|
| | | | |

FIG. 10

2
COMMUNICATION SYSTEM
105
1
3
eUICC
DCM
SM-DP+
AAA/HSS
INTERNET
INPUT PROFILEREQUEST
S11
PROFILE REQUEST
S12
WiFi ETC.
S13
DOWNLOAD OWNER PROFILE
S14
S15
INSTALL OWNER PROFILE
S21
INPUT ENABLING OF OWNER PROFILE
S22
S23
ENABLE OWNER PROFILE
S24
S25
CONNECTION ESTABLISHING PROCEDURE
COMMUNICATION ENABLED

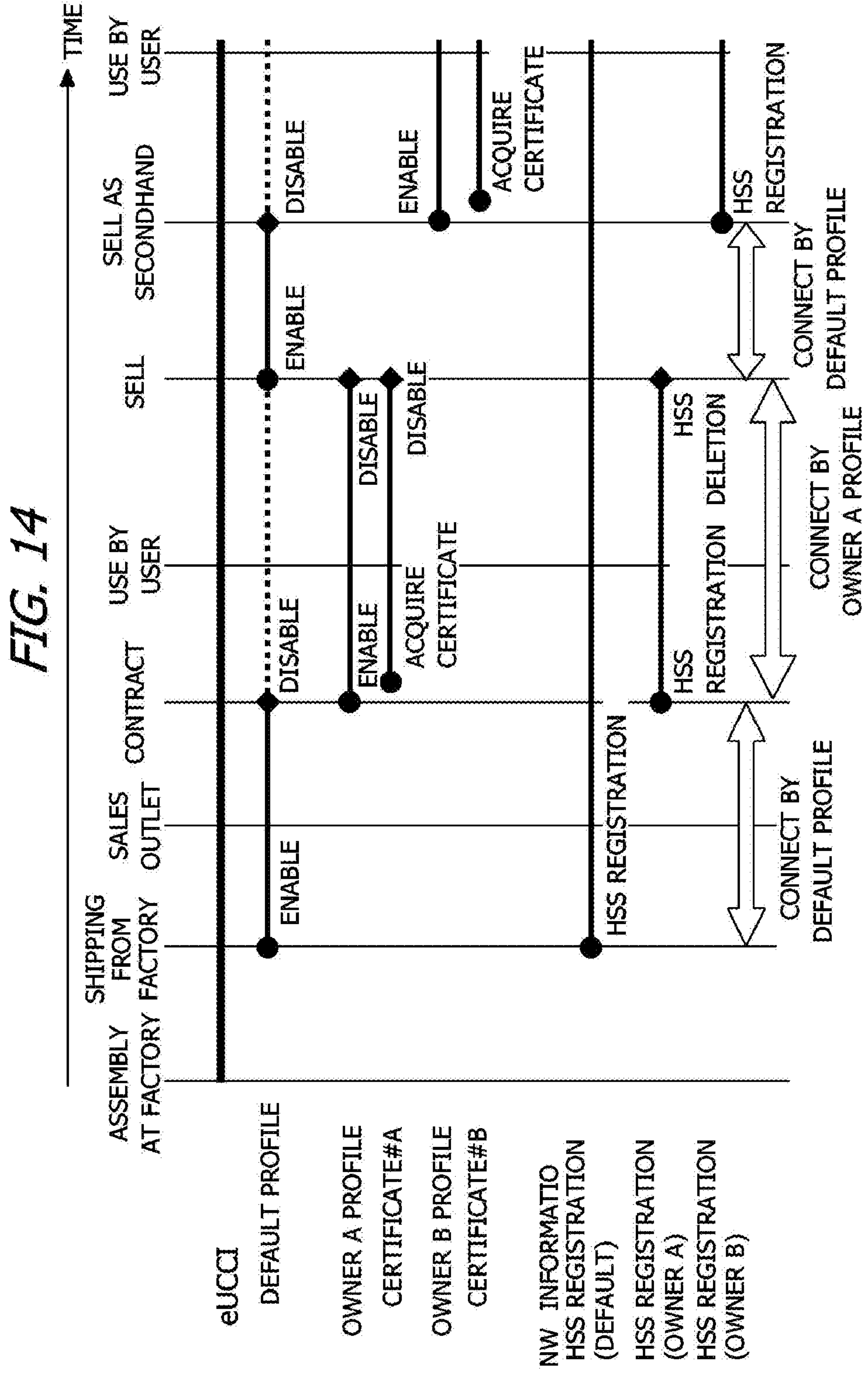

FIG. 14
TIME
ASSEMBLY AT FACTORY
SHIPPING FROM FACTORY
SALES OUTLET
CONTRACT
USE BY USER
SELL
SELL AS SECONDHAND
USE BY USER
eUCCI
DEFAULT PROFILE
OWNER A PROFILE
CERTIFICATE#A
OWNER B PROFILE
CERTIFICATE#B
NW INFORMATIO
HSS REGISTRATION (DEFAULT)
HSS REGISTRATION (OWNER A)
HSS REGISTRATION (OWNER B)
ENABLE
DISABLE
ENABLE
DISABLE
ENABLE
ACQUIRE CERTIFICATE
DISABLE
DISABLE
ENABLE
ACQUIRE CERTIFICATE
HSS REGISTRATION
HSS REGISTRATION
HSS REGISTRATION DELETION
HSS REGISTRATION
CONNECT BY DEFAULT PROFILE
CONNECT BY OWNER A PROFILE
CONNECT BY DEFAULT PROFILE

INFORMATION PROCESSING APPARATUS, METHOD, AND SYSTEM

CROSS REFERENCE TO RELATED APPLICATION

This application claims the benefit of Japanese Patent Application No. 2023-094248, filed on Jun. 7, 2023, which is hereby incorporated by reference herein in its entirety.

BACKGROUND

Technical Field

The present disclosure relates to wireless communication where a SIM is used in a terminal.

Description of the Related Art

There is disclosed a technology where an UICC holds an operational profile including settings for connecting to a first wireless communication network, a bootstrap profile for connecting to a second wireless communication network, and an applet, where, when a loss of operational connectivity with the first wireless communication network is detected in a case where the first wireless communication network is connected using the operational profile, the applet performs connection to the second wireless communication network using the bootstrap profile, and re-establishes wireless communication to and from a host apparatus (for example, Patent document 1).

CITATION LIST

Patent Document

[Patent document 1] Japanese Patent Laid-Open No. 2023-515277

An aspect of the disclosure is aimed at providing an information processing apparatus, a method, and a system that enable identification of a current owner of the information processing apparatus by a server that provides a predetermined service.

SUMMARY

One aspect of the present disclosure is an information processing apparatus including:

an eUICC (Embedded Universal Integrated Circuit Card) that holds first profile information that is used for connection to a first communication system and that is associated with a first owner of the information processing apparatus; and a processor configured to connect to the first communication system by using the first profile information, wherein the processor is further configured to acquire, from a predetermined certificate authority, a first electronic certificate that certifies that first authentication information is for the first owner, the first authentication information being used for authentication by a first server trusted by the first communication system and corresponding to the first profile information, store the first authentication information and the first electronic certificate in the eUICC, and receive authentication by the first server by using the first authentication information and the first electronic certificate.

Another aspect of the present disclosure is a method executed by a computer including an eUICC (Embedded Universal Integrated Circuit Card) that holds first profile information that is used for connection to a first communication system and that is associated with a first owner of an information processing apparatus, the method including:

connecting to the first communication system by using the first profile information;

acquiring, from a predetermined certificate authority, a first electronic certificate that certifies that first authentication information is for the first owner, the first authentication information being used for authentication by a first server trusted by the first communication system and corresponding to the first profile information;

storing the first authentication information and the first electronic certificate in the eUICC; and receiving authentication by the first server by using the first authentication information and the first electronic certificate.

Another aspect of the present disclosure is an information processing apparatus including:

an eUICC (Embedded Universal Integrated Circuit Card) capable of holding a plurality of pieces of profile information that are used for connection to a communication network; and a processor configured to enable one of the plurality of pieces of profile information, and connect to the communication network by using profile information that is enabled, wherein the eUICC holds, at a time of shipping of the information processing apparatus from a factory, default profile information that is used for connection to a first communication system, and the processor is configured to enable the default profile information at the time of shipping of the information processing apparatus from the factory, and connect to the first communication system by using the default profile information, and disable the default profile information and enable first profile information corresponding to a first owner of the information processing apparatus in a case where the first profile information is stored in the eUICC, and connect to the first communication system by using the first profile information.

According to an aspect of the present disclosure, a server that provides a predetermined service may identify a current owner of an information processing apparatus.

BRIEF DESCRIPTION OF DRAWINGS

FIG. 6 is a diagram illustrating an example of information that is held in a subscriber information database;

FIG. 7 is a diagram illustrating an example of information that is held in a terminal connection information database;

FIG. 10 is an example of a flowchart of a process of enabling or disabling a profile that is performed by the DCM;

FIG. 14 is a diagram illustrating an example of change in the profile information that is used by the vehicle.

DESCRIPTION OF THE EMBODIMENTS

Figure 1:
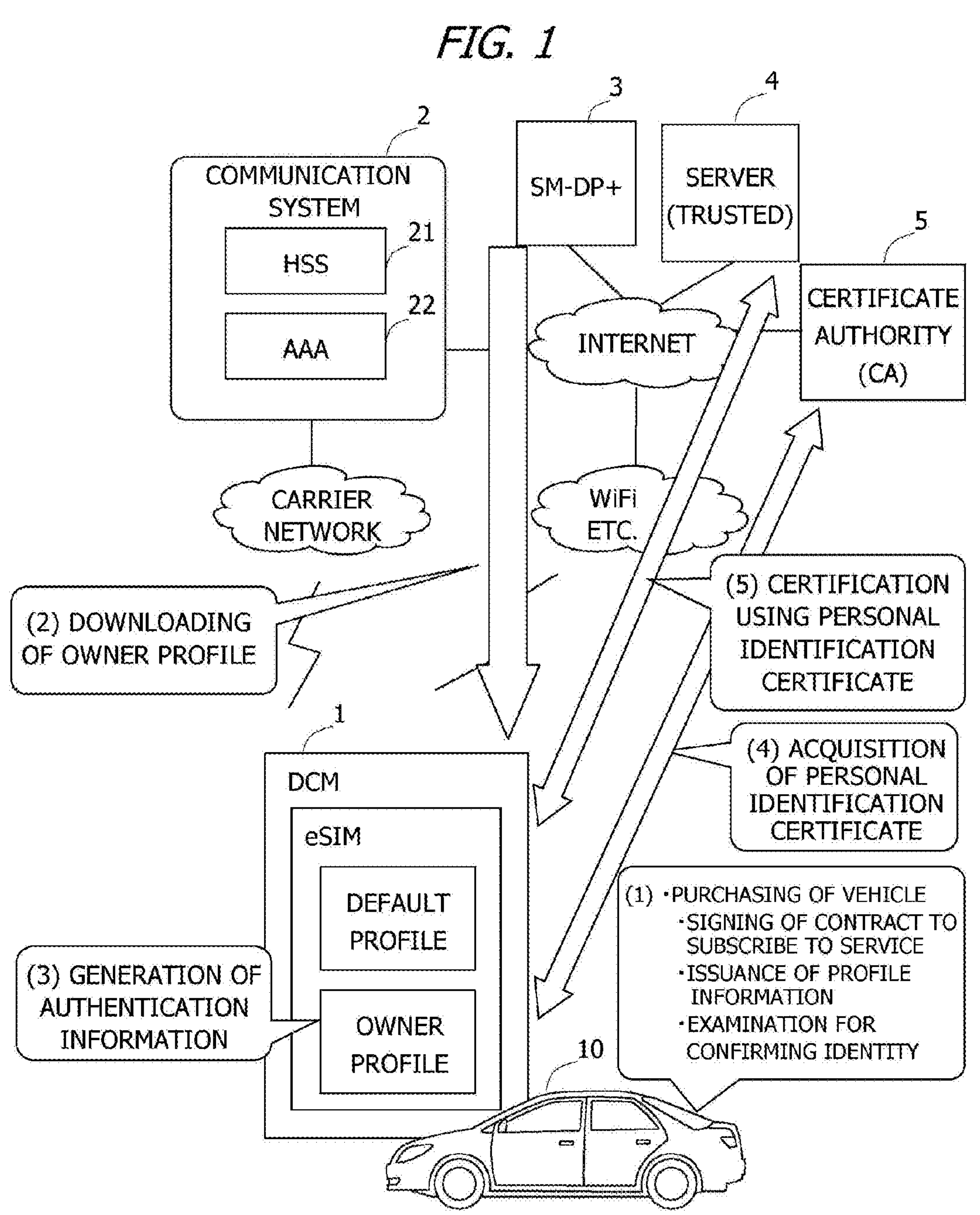
FIG. 1 is a diagram illustrating an example of provision of service to a vehicle according to a first embodiment.

At a time of purchase of a vehicle, presentation of a seal registration certificate or the like is demanded to confirm identify of a new owner of the vehicle. An electronic certificate such as an individual number card can also be used instead of the seal registration certificate. An examination is performed by a predetermined certificate authority (alternatively referred to as certification authority: CA) based on such an identity document, and the vehicle and the owner are associated with each other, and an electronic certificate indicating that the owner of the vehicle is legitimate is issued. For example, the electronic certificate is stored in a vehicle-mounted apparatus that is mounted on a vehicle including a communication function, such as a connected car, and is used for authentication based on the electronic certificate at a time of receiving a service related to the vehicle.

The electronic certificate for certifying the owner of a vehicle is often stored in a secure storage area in the vehicle-mounted apparatus, and in such a case, it is impossible to rewrite the electronic certificate. For example, the owner of a vehicle may change due to the vehicle being sold second hand. However, because the electronic certificate certifying the owner that is stored in the secure storage area in the vehicle-mounted apparatus is not rewritten, the electronic certificate of the first owner is maintained even when the owner of the vehicle is changed. Accordingly, it is impossible for a party that provides a service to the vehicle to identify a current owner even when the first owner is no longer the owner of the vehicle, and to provide a service matching the current owner.

In view of the problem described above, in an aspect of the present disclosure, an electronic certificate for certifying identity of an owner is held in an eUICC of an information processing apparatus. The electronic certificate for personal identification can thus be rewritten, and a service provider that performs authentication using the electronic certificate is enabled to identify a current owner of the information processing apparatus.

More specifically, an aspect of the present disclosure may be an information processing apparatus including an eUICC that holds first profile information that is used for connection to a first communication system and that is associated with a first owner of the information processing apparatus, and a processor configured to connect to the first communication system by using the first profile information. The processor may acquire, from a predetermined certificate authority, a first electronic certificate that certifies that first authentication information is for the first owner, the first authentication information being used for authentication by a first server trusted by the first communication system and corresponding to the first profile information. The processor may store the first authentication information and the first electronic certificate in the eUICC. The processor may receive authentication by the first server by using the first authentication information and the first electronic certificate.

For example, the information processing apparatus may be a vehicle-mounted apparatus mounted on a vehicle, a smartphone, a tablet terminal, a wearable terminal, an IoT terminal, or a terminal that is capable of wireless communication based on a mobile communication scheme. For example, the vehicle-mounted apparatus may be a DCM (Data Communication Module), a car navigation apparatus, a dashboard camera, or an ECU (Electronic Control Unit). For example, the processor is a CPU (Central Processing Unit), a DSP (Digital Signal Processor), a processor such as a data communication processor, or a circuit such as an FPGA (Field-Programmable Gate Array).

The first communication system may be a wireless communication system that is compatible with 4G (LTE-Advanced), 5G, 6G or later mobile communication scheme, 3G or the like, and that requires that the eUICC be provided in a terminal. The eUICC may be a chip or a card. The authentication information may be key information such as a public key, for example. The first server that is trusted by the first communication system may be a server inside the first communication system or a server outside the first communication system. The first communication system may be a system that is managed by a manufacturer of the information processing apparatus or an apparatus where the information processing apparatus is mounted, or a communication system of an operator that issues profile information to be held in the eUICC.

The first profile information corresponds to the first owner, and thus, when the owner of the information processing apparatus is changed, the profile information is also changed. The first authentication information corresponds to the first profile information, and thus, when the profile information is changed, the authentication information is also changed. The first electronic certificate is issued for the first authentication information, and thus, when the authentication information is changed, the electronic certificate is also changed. That is, when the owner is changed, the electronic certificate is changed. In an aspect of the present disclosure, by causing the electronic certificate for certifying identify of the owner to be held in the eUICC where data can be rewritten, the electronic certificate can be rewritten when the owner of the information processing apparatus is changed, for example. Accordingly, a service provider that performs authentication using the electronic certificate for personal identification may correctly identify the current owner of the information processing apparatus.

In an aspect of the present disclosure, the information processing apparatus may further include an applet configured to generate the first authentication information with the first profile information as a key. The processor may start the applet, and cause the applet to generate the first authentication information. Accordingly, the electronic certificate for personal identification is desired to be changed according to change of the profile information. Other than change of the owner of the information processing apparatus, the first authentication information may be updated also in a case where the profile information is update due to problems such as vulnerability, for example, and security may be maintained.

Furthermore, the processor may acquire the first profile information and the applet from a second server that manages profile information, and store the first profile information and the applet in the eUICC. For example, in the case where the first communication system is a system compatible with LTE (Long Term Evolution), the second server is an SM-DP+(Subscription Manager Data Preparation+) server. Accordingly, like the profile information, the applet may also be rewritten remotely.

Furthermore, the processor may be configured to acquire at least the applet after update from the second server in a case where the applet is updated, and store the applet after update in the eUICC. The processor may start the applet after update, cause the applet after update to newly generate the first authentication information, acquire the electronic certificate from the predetermined certificate authority (CA) in relation to the first authentication information that is newly generated, and store, in the eUICC, the first authentication information that is newly generated and the electronic certificate that is newly acquired. Accordingly, for example, in a case where vulnerability of the electronic certificate is reduced, the applet can be updated by updating a generation algorithm for the first authentication information, for example, and the first authentication information and the electronic certificate may be updated.

In an aspect of the present disclosure, the processor may be configured to acquire, from the predetermined certificate authority, in a case where second profile information that is newly held in the eUICC is enabled, a second electronic certificate that certifies that second authentication information corresponding to the second profile information is for a second owner. The second profile information is used for connection to the first communication system, and is associated with the second owner of the information processing apparatus. The processor may be configured to store the second authentication information and the second electronic certificate in the eUICC, and receive authentication by the first server by using the second authentication information and the second electronic certificate. At this time, the first profile information and the first electronic certificate may be disabled or deleted. Accordingly, for example, in a case where the owner of the information processing apparatus changes from the first owner to the second owner, the first server may be prevented from mixing up the first owner (a previous owner) and the second owner (a current owner).

With a vehicle that is capable of communication, such as a connected car, various data pieces such as a state of the vehicle and drive data may be collected by a manufacturer of the vehicle. However, a vehicle may be placed in a state where communication is possible after the vehicle is purchased and a contract for a carrier network or the like with a purchaser (owner) is signed, and from shipping from a factory to purchase, the vehicle is not in a state where communication is possible, and thus, it is impossible to collect information about the vehicle.

In view of the problem described above, in an aspect of the present disclosure, default profile information may be stored in the eUICC of the information processing apparatus so that the information processing apparatus is able to perform communication from a time of shipping from the factory. Accordingly, the information processing apparatus may be placed in a state where communication is possible also between shipping from the factory and purchase, and a manufacturer of the information processing apparatus or an apparatus where the information processing apparatus is mounted is enabled to collect information about the information processing apparatus also between shipping from the factory and purchase, for example.

More specifically, an aspect of the present disclosure may be an information processing apparatus including an eUICC capable of holding a plurality of pieces of profile information that are used for connection to a communication network, and a processor configured to enable one of the plurality of pieces of profile information, and connect to the communication network by using profile information that is enabled. The eUICC may hold, at a time of shipping of the information processing apparatus from a factory, default profile information that is used for connection to a first communication system. The processor may be configured to enable the default profile information at the time of shipping of the information processing apparatus from the factory, and connect to the first communication system by using the default profile information. The processor may be configured to disable the default profile information and enable first profile information corresponding to a first owner of the information processing apparatus in a case where the first profile information is stored in the eUICC, and connect to the first communication system by using the first profile information.

For example, the information processing apparatus may be a vehicle-mounted apparatus mounted on a vehicle, a smartphone, a tablet terminal, a wearable terminal, an IoT terminal, or a terminal that is capable of wireless communication based on a mobile communication scheme. For example, the vehicle-mounted apparatus may be a DCM, a car navigation apparatus, a dashboard camera, or an ECU. For example, the processor may be a CPU, a DSP, a processor such as a data communication processor, or a circuit such as an FPGA. The first communication system may be a wireless communication system that is compatible with 4G, 5G, 6G or later mobile communication scheme, 3G or the like, and that requires that the eUICC be provided in a terminal. The first communication system may be a system that is managed by a manufacturer of the information processing apparatus or an apparatus where the information processing apparatus is mounted, or a communication system of an operator that issues profile information to be held in the eUICC.

According to an aspect of the present disclosure, the information processing apparatus is able to connect to the first communication system by the default profile information from when shipping from the factory is performed to when purchase is made and the owner is determined. Accordingly, the first communication system is able to collect information about the information processing apparatus also from when shipping from the factory is performed to when purchase is made.

In an aspect of the present disclosure, that a communication fee is billed to a predetermined operator may be set in the default profile information. In the default profile information, the predetermined operator that is set as a billing destination may be an operator that collects information about the information processing apparatus. For example, the predetermined operator may be an administrator of the first communication system (a manufacturer of the information processing apparatus, a manufacturer of an apparatus, such as a vehicle, where the information processing apparatus is mounted, or an operator that issues the profile information), or an operator that requests the administrator of the first communication system to collect information about the information processing apparatus.

According to an aspect of the present disclosure, a communication fee for communication that is performed by connecting to the first communication system by the default profile information from when shipping from the factory is performed to when purchase is made is not billed to the owner, and thus, burden of a communication cost is not placed on the owner. Furthermore, the default profile information is disabled after the owner of the information processing apparatus is determined, and thus, the predetermined operator does not have to be responsible for the communication fee after the owner is determined.

In an aspect of the present disclosure, in a case where a predetermined secondhand dealer sells the information processing apparatus second hand, the processor may be configured to disable or delete the first profile information, enable the default profile information, and connect to the first communication system by using the default profile information. Accordingly, even when the information processing apparatus is being sold second hand, the information processing apparatus is in a state where communication is possible, and information about the information processing apparatus may be collected.

As another aspect of the present disclosure, there may be cited a system including the information processing apparatus, and a third server that holds information indicating whether profile information used for connection to the first communication system by the information processing apparatus is the default profile information or not. In the case where the first communication system is a system that is compatible with 4G, the third server is an HSS (Home Subscriber Server), for example.

According to an aspect of the present disclosure, whether the information processing apparatus is on sale or not may be identified based on the information that is held by the third server and that indicates whether the profile information used for connection to the first communication network is a default file or not.

Other aspects of the present disclosure may be a method executed by a computer to perform processes of the information processing apparatus, a program for causing a computer to perform processes of the information processing apparatus, and a computer-readable recording medium storing the program.

In the following, embodiments of the present disclosure will be described with reference to the drawings. The configuration of the embodiments described below are examples, and the present disclosure is not limited to the configuration of the embodiments.

First Embodiment

FIG. 1 is a diagram illustrating an example of provision of service to a vehicle 10 according to a first embodiment. In the first embodiment, a communication system 2 is a system that is managed by a manufacturer of the vehicle 10. The communication system 2 performs collection of information about communication by the vehicle 10 and control related to communication by the vehicle 10. Furthermore, the communication system 2 passes communication by the vehicle 10 to an external network such as the Internet via the communication system 2, and thereby enforces security of the vehicle 10. Furthermore, the communication system 2 provides, to the vehicle 10, services such as a monitoring service related to a state of the vehicle, a navigation service, and an emergency report service, for example. A server 4 is a server trusted by the communication system 2, and the server 4 provides the services to the vehicle 10. In FIG. 1, the server 4 exists outside the communication system 2, but the server 4 may instead be included in the communication system 2.

The vehicle 10 is a connected car, and a DCM 1 that provides a communication function is mounted thereon. In the first embodiment, the manufacturer of the vehicle 10 that is an administrator of the communication system 2 does not have a communication infrastructure. Accordingly, an owner of the vehicle 10 signs a contract with a communication carrier, and connects the vehicle 10 to the communication system 2 via a communication carrier network. Furthermore, the DCM 1 is also capable of communication by a communication scheme different from a mobile communication scheme, such as WiFi communication. For example, the DCM 1 may connect to the Internet using WiFi as an access network. In the case where WiFi is used as the access network, the DCM 1 may connect to the Internet without connecting to the communication system 2. However, in this case, services from the communication system 2 are not received. However, even in a case where WiFi is used as the access network, depending on settings, the DCM 1 may connect to the communication system 2, and may connect to the Internet via the communication system 2. However, in the first embodiment, description of a case where the DCM 1 connects to the communication system 2 in a case where WiFi is used as the access network will be omitted.

The communication system 2, an SM-DP+3, the server 4, and a certificate authority 5 are each connected to a public network such as the Internet, and are capable of communicating with one another. Furthermore, the vehicle 10 is capable of connecting to the SM-DP+3, the server 4, and the certificate authority 5 by connecting to a public network such as the Internet through a WiFi network, for example.

The communication system 2 includes an HSS 21, and an AAA (Authentication Authorization Accounting) 22. However, FIG. 1 extracts and illustrates component elements related to the first embodiment, and component elements of the communication system 2 are not limited to those illustrated in FIG. 1. The HSS 21 holds information about a subscriber who connects to the communication system 2. For example, information about the subscriber that is held by the HSS 21 includes identification information on the owner of the vehicle 10, identification information on the vehicle 10 (DCM 1), authentication information used for authentication of the DCM 1, and identification information on profile information used for authentication.

The AAA 22 performs authentication of the DCM 1 by a predetermined authentication scheme and by using information about the DCM 1 held by the HSS 21. The authentication scheme adopted by the AAA 22 is AKA (Authentication and Key Agreement) authentication used for authentication of a carrier network, for example. However, the authentication scheme adopted by the AAA 22 is not limited to AKA authentication, and an authentication scheme unique to the communication system 2 may instead be adopted.

The SM-DP+3 manages profile information. The SM-DP+3 holds profile information, issued by the communication system 2, about a subscriber (in the first embodiment, the owner of the vehicle 10) who signed a subscription contract for a service of the communication system 2. Furthermore, the SM-DP+3 provides the profile information corresponding to the owner of the vehicle 10 in response to a request from the DCM 1. For example, the SM-DP+3 is managed by a same administrator as the administrator of the communication system 2.

The certificate authority 5 is a system that performs examination as to whether the owner of the vehicle 10 is legitimate, and that issues an electronic certificate that indicates that the authentication information used by the vehicle 10 is for the person in question. The certificate authority 5 is a system that is managed by a reliable third-party organization. In the following, an electronic certificate indicating that the authentication information used by the vehicle 10 is for the person in question will be simply referred to as a personal identification certificate.

The DCM 1 includes an eSIM, and connects to the communication system 2 by using profile information held by the eSIM. In the first embodiment, it is assumed that the DCM 1 is mounted on the vehicle 10, and thus, a purchaser of the vehicle 10, the owner of the vehicle 10, an owner of the DCM 1, and a person who signed a contract with the communication system 2 are the same person.

In the first embodiment, default profile information that is used for connection of the communication system 2 is stored in the eSIM of the DCM 1. For example, the default profile information is downloaded, by staff of the manufacturer, from the SM-DP+3 via WiFi or the like at the time of shipping from a factory, and is stored in the eSIM and enabled. The default profile information is profile information that is set in relation to the communication system 2. That is, it is indicated that, while the DCM 1 is connected to the communication system 2 using the default profile information, the owner of the vehicle 10 is the communication system 2, or in other words, the vehicle 10 is not owned by a specific individual and is on sale. Because the default profile information is held in the eSIM of the DCM 1, the DCM 1 is connected to the communication system 2 and is placed in a state where communication is possible after shipping from the factory. Furthermore, the communication system 2 is capable of acquiring information about the DCM 1 after the DCM 1 is shipped from the factory, and of monitoring the state of the vehicle 10 while the vehicle 10 is on sale, for example. In the following, the default profile information will be simply referred to as a default profile.

In the first embodiment, a flow from purchase of the vehicle 10 by the owner of the vehicle 10 to reception of a service provided by the communication system 2 is as described below.

(1) When a contract to purchase the vehicle 10 is signed, documents such as an identify document, such as a seal registration certificate, and a garage certificate are provided by a new owner. Furthermore, together with the contract to purchase the vehicle 10, a contract to subscribe to services of the communication system 2 is also signed. Information about the owner is registered in the communication system 2 based on contents of the contract to purchase the vehicle 10 and the contract to subscribe to services of the communication system 2.

The information about the owner that is registered in the communication system 2 includes name, address, sex, date of birth, personal information on the owner such as an identity document, information about the purchased vehicle, and subscriber information related to services of the communication system 2, for example. The information about the purchased vehicle includes name of the vehicle, model, information on a license plate, and a location of a garage, for example. The subscriber information related to services of the communication system 2 includes identification information on the owner (IMSI), identification information on the DCM 1 (IMEI), profile information, and, settings information including contents of contract related to a service plan and a payment method, for example. The subscriber information related to services of the communication system 2 is held in the HSS 21. The personal information on the owner and information about the vehicle may be held in the HSS 21, or may be held in a database different from the HSS 21.

The contract to subscribe to services of the communication system 2 may be signed at a same timing as the contract to purchase the vehicle 10, or may be signed at a later timing than the contract to purchase the vehicle 10. When the contract to subscribe to services of the communication system 2 is signed, profile information corresponding to the owner is issued by the communication system 2 based on the subscriber information, and the profile information is registered in the SM-DP+3. Furthermore, information about an identity document (seal registration certificate, identity document with a face image, individual number card) is transmitted from the communication system 2 to the certificate authority 5, and examination for confirming identity of the owner of the vehicle 10 is performed by the certificate authority 5, and information associating the owner of the vehicle 10 and the vehicle 10 (DCM 1) is registered in the certificate authority 5.

(2) The owner of the vehicle 10 operates the DCM 1, and downloads the profile information corresponding to the owner of the vehicle 10 from the SM-DP+3. Additionally, download of the profile information may be performed via WiFi, or in the first embodiment, the DCM 1 is connected to the communication system 2 using the default profile, and thus, download may be performed via the communication system 2, for example. The profile information corresponding to the owner of the vehicle 10 is stored in the eSIM of the DCM 1. In the following, the profile information corresponding to the owner of the vehicle 10 will be simply referred to as an owner profile.

For example, when the owner profile is enabled by operation by the owner of the vehicle 10, the default profile is disabled. Then, connection between the DCM 1 and the communication system 2 is re-established with the owner of the vehicle 10 as the subscriber of services of the communication system 2. In this process, the DCM 1 receives authentication by the AAA 22 by using the owner profile information. The AAA 22 performs authentication of the owner of the vehicle 10 by using the subscriber information that is held in the HSS 21 and that corresponds to the owner of the vehicle 10. Accordingly, that the DCM 1 is connected to the communication system 2 by using the owner profile is recorded in the HSS 21. The DCM 1 is thereafter allowed to connect to the Internet via the communication system 2.

(3) For example, in the case where the owner of the vehicle 10 receives a service from the server 4 as one of services of the communication system 2, the DCM 1 receives authentication by the server 4. For this purpose, the DCM 1 generates authentication information. In the first embodiment, the DCM 1 generates the authentication information with the owner profile as a key. An authentication scheme adopted by the server 4 is TLS (Transport Layer Security) authentication, for example. The authentication information is a public key and a private key used for TLS authentication, for example.

(4) The DCM 1 requests the certificate authority 5 to issue a personal identification certificate certifying the owner of the vehicle 10 in relation to the authentication information. Because an association between the vehicle 10 (DCM 1) and the owner of the vehicle 10 is already registered in the certificate authority 5, the personal identification certificate is issued by the certificate authority 5 based thereon. The personal identification certificate is created based on the identity document, and strongly certifies that the person in question is legitimate. The DCM 1 acquires the personal identification certificate from the certificate authority 5, and stores the same, together with the authentication information, in the eSIM in association with the owner profile. Additionally, the authentication information that is transmitted to the certificate authority 5 and in relation to which the personal identification certificate is issued is the public key used for TLS authentication, for example. The public key and the private key for TLS are stored in the eSIM.

(5) The DCM 1 accesses the server 4 via the communication system 2, transmits the personal identification certificate held by the eSIM to the server 4, and receives authentication by the server 4. When the authentication succeeds, the DCM 1 is thereafter able to receive the service of the server 4.

In the first embodiment, the authentication information that is used for authentication by the server 4 is generated with the owner profile information on the vehicle 10 as a key. Furthermore, the personal identification certificate for the authentication information is stored in the eSIM, and is rewritable. Accordingly, for example, when the owner profile to be enabled is changed due to change of the owner of the vehicle 10, the personal identification certificate to be used for authentication by the server 4 is also changed. Accordingly, even when the owner of the vehicle 10 is changed, the server 4 may identify a current owner of the vehicle 10 based on the personal identification certificate used for authentication of the DCM 1.

Additionally, as a connection method for the DCM 1 and the communication system 2 via the carrier network, two methods are mainly conceivable. The first is a method where the communication system 2 is an MVNO (Mobile Virtual Network Operator) and includes a billing function related to connection to the communication system 2, and the DCM 1 performs connection using a carrier network that has an MVNO contract with the communication system 2. In this case, settings regarding billing of the communication fee are performed in the default profile and the owner profile in the eSIM. For example, as a billing destination of the communication fee, the administrator of the communication system 2 (manufacturer of the vehicle 10) is set in the default profile, and the owner of the vehicle 10 is set in the owner profile.

The other method is a method where the communication system 2 is not the MVNO and does not have the billing function related to connection to the communication system 2, and the DCM 1 connects, on the carrier network, to a gateway (ePDG) in the communication system 2 by an IPsec tunnel. In this case, the DCM 1 includes another SIM (in the following, a second SIM) for connecting to the carrier network, and the owner of the vehicle 10 is requested to also sign a contract with the carrier network, in addition to the communication system 2. In relation to authentication at the time of establishing connection between the DCM 1 and the carrier network, profile information that is held in the second SIM and that is used for connection to the carrier network is used. The default profile or the owner profile in the eSIM is used for authentication related to establishment of connection to the communication system 2 after connection between the DCM 1 and the carrier network is established. In this case, there is no special contract between the DCM 1 and the carrier network used for connection to the communication system 2 and the communication system 2, and the owner of the vehicle 10 may freely select the carrier network. Furthermore, settings regarding billing of the communication fee are not performed in the default profile and the owner profile in the eSIM. The second SIM may be an eSIM, or a card-type SIM. In the following, description will be given assuming that the second SIM is an eSIM.

For example, with the DCM 1, the default profile is stored in the eSIM at the time of shipping of the vehicle 10 from the factory, and profile information to be used for connection to a carrier network specified by the manufacturer of the vehicle 10 is stored in the second SIM. In the profile information, the administrator of the communication system 2 (manufacturer of the vehicle 10) is set as the billing destination of the communication fee, for example. As described above, when the vehicle 10 is purchased, the owner profile is stored in the eSIM, and profile information to be used for connection to a carrier network selected by the owner is stored in the second SIM. In the profile information, the owner of the vehicle 10 is set as the billing destination of the communication fee.

In the first embodiment, regardless of the connection method between the DCM 1 and the communication system 2 via a carrier network, the communication fee arising during connection to the communication system 2 using the default profile is billed to the administrator of the communication system 2 (manufacturer of the vehicle 10).

Figure 2:
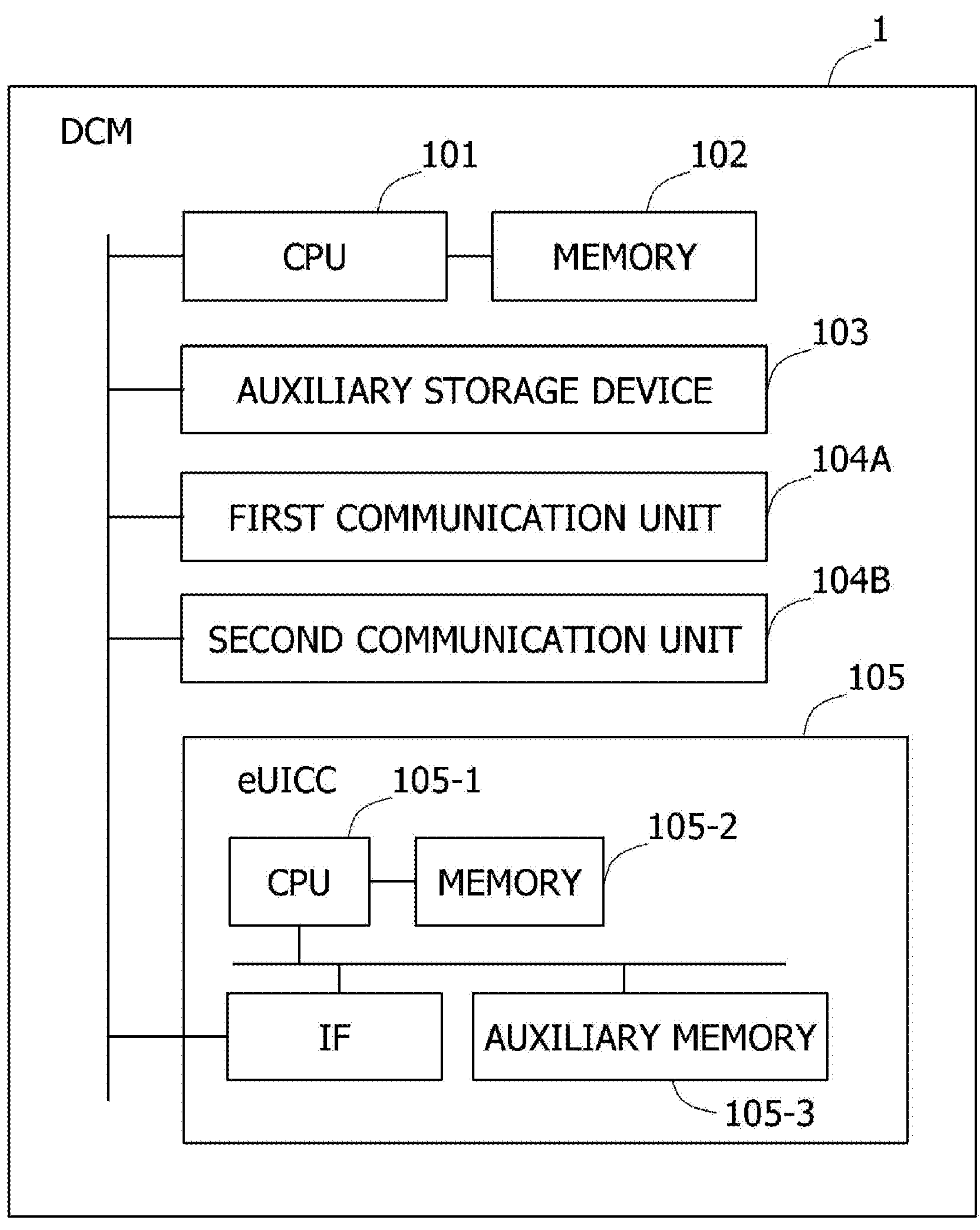
FIG. 2 is a diagram illustrating an example hardware configuration of a DCM.

FIG. 2 is a diagram illustrating an example hardware configuration of the DCM 1. As hardware components, the DCM 1 includes a CPU 101, a memory 102, an auxiliary storage device 103, a first communication unit 104A, a second communication unit 104B, and an eUICC 105. For example, the auxiliary storage device 103 is an HDD (Hard Disk Drive), and an SSD (Solid State Drive). For example, programs held in the auxiliary storage device 103 include an OS (Operating System), a communication control program, and various other programs. The communication control program is a program for connecting to the communication system 2 using profile information in the eUICC 105. For example, the memory 102 includes semiconductor memories such as a ROM (Read Only Memory) and a RAM (Random Access Memory). The memory 102 and the auxiliary storage device 103 are each an example of a computer-readable recording medium.

The CPU 101 performs various processes by loading, into the memory 102, and executing the OS and various other programs held in the auxiliary storage device 103. The number of CPUs 101 is not limited to one, and may be more than one. The CPU 101 is an example of "processor".

In the first embodiment, the first communication unit 104A performs communication with an external apparatus based on a 4G mobile communication scheme. Additionally, in the case where the communication system 2 is a system that is compatible with a 5G, 6G or later mobile communication scheme, the first communication unit 104A is also compatible with the mobile communication scheme with which the communication system 2 is compatible. The second communication unit 104B performs wireless communication based on a scheme different from the mobile communication scheme. For example, the second communication unit 104B is compatible with a wireless communication scheme such as WiFi or Bluetooth (registered trademark).

In the first embodiment, the eUICC 105 is a chip-type eUICC. However, such a case is not restrictive, and the eUICC 105 may instead be card-type and may be a card that can be inserted/removed from the DCM 1. In this case, the DCM 1 is provided with a slot for an eSIM card, a reader and a writer. In FIG. 2, it is assumed that the eUICC 105 is chip-type and is embedded in the DCM 1.

The eUICC 105 includes a CPU 105-1, a memory 105-2, and an auxiliary memory 105-3. The CPU 105-1 and the memory 105-2 are the similar as the CPU 101 and the memory 102, respectively. The auxiliary memory 105-3 is a flash memory or an EEPROM, for example. The auxiliary memory 105-3 stores an OS of the eUICC, a program for downloading the profile information, and a program for managing the profile information, for example.

Additionally, the hardware configuration of the DCM 1 is not limited to the configuration illustrated in FIG. 2. For example, in addition to the eUICC 105, a device corresponding to a SIM may be further included. The device corresponding to a SIM is an eUICC, or a SIM slot and a SIM card reader for a SIM card in a UICC that is card-type and that can be inserted/removed.

Figure 3:
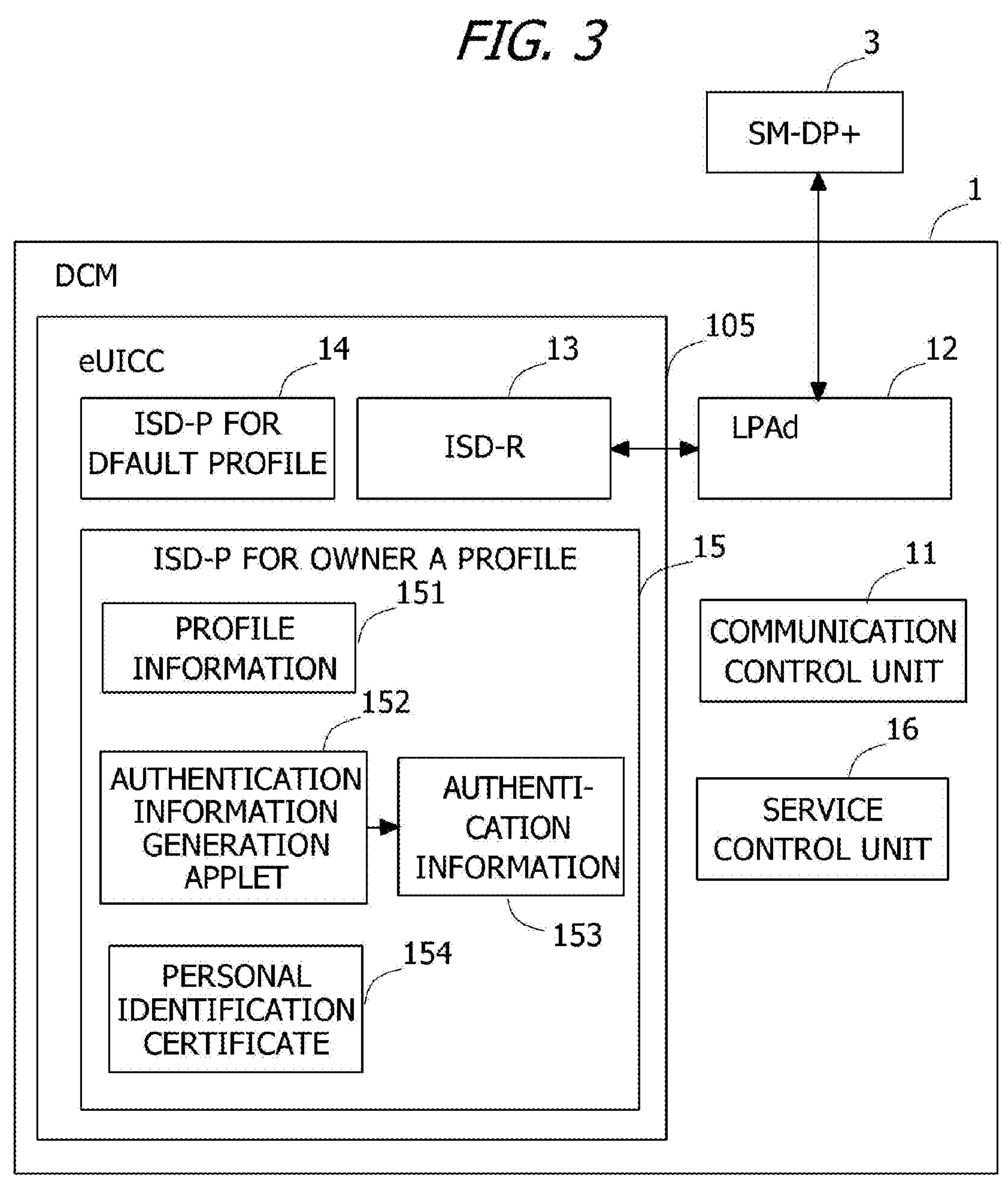
FIG. 3 is an example of a functional configuration of the DCM.

FIG. 3 is an example of a functional configuration of the DCM 1. As functional components, the DCM 1 includes a communication control unit 11, an LPAd 12, and a service control unit 16. The communication control unit 11 controls connection between the DCM 1 and the communication system 2 by using enabled profile information held in the eUICC 105. Details of a process by the communication control unit 11 will be given later.

The service control unit 16 performs control for receiving services of the communication system 2 including the service of the server 4. More specifically, the service control unit 16 performs processes related to authentication with the server 4 and services.

The LPAd 12 manages profile information that is held in the eUICC 105. That is, processing by the DCM 1 on the eUICC 105 is performed via the LPAd 12. More specifically, the LPAd 12 downloads profile information from the SM-DP+3 according to an instruction from a user, and transfers the downloaded profile information to the eUICC 105. Furthermore, the LPAd 12 receives an instruction from the user regarding enabling, disabling, or deletion of the profile information held in the eUICC 105, and transfers the instruction to the eUICC 105. Moreover, for example, the LPAd 12 issues an inquiry to the SM-DP+3 regarding whether there is an event such as update of the profile information. Moreover, in a case where the communication control unit 11 and the service control unit 16 access information that is stored in the eUICC 105, such access is performed via the LPAd 12.

As functional components, the eUICC 105 includes an ISD-R (Issuer Security Domain Root) 13, an ISD-P (Issuer Security Domain Profile) for default profile 14, and an ISD-P for owner profile 15. These functional components are achieved by the CPU 105-1 executing programs stored in the auxiliary memory 105-3.

The ISD-R 13 is an interface to the LPAd 12. The ISD-R 13 receives transfer of downloaded profile information from the LPAd 12, and installs the profile information. Additionally, communication between the ISD-R 13 and the SM-DP+3 related to download of the profile information uses secure communication. Furthermore, according to an instruction input from the LPAd 12, the ISD-R 13 enables, disables, or deletes corresponding profile information.

The ISD-P is an area for storing the profile information. The ISD-P is generated for each profile information. The profile information is downloaded from the SM-DP+3 as data that is packaged together with an applet described later, a control program for an OTA (Over The Air) function, a program for controlling access to a wireless communication network, and the like. The packaged data including the profile information will be referred to below as a profile package. The profile package includes an encoded part for storing the profile information and the like, and a part for storing a creation procedure for the ISD-P. The ISD-P is created by the ISD-R 13 based on the creation procedure for the ISD-P described in the profile package. The encoded part of the profile package is decoded by the OS of the eUICC, and the profile information and the like are developed in the ISD-P. In the following, the ISD-P may sometimes be referred to as a profile. Furthermore, enabling of the profile information refers to activation of the ISD-P.

The ISD-P for default profile 14 is created at a time of shipping from the factory, when a package of the default profile is downloaded and installed from the SM-DP+3. The ISD-P for owner profile 15 is created when a package of the owner profile is downloaded and installed from the SM-DP+3 by an operation by the owner of the vehicle 10.

The ISD-P for owner profile 15 includes profile information 151, an authentication information generation applet 152, authentication information 153, and a personal identification certificate 154. The profile information 151 is owner profile of the vehicle 10. For example, the profile information 151 includes an IMSI (International Mobile Subscription Identity) that is an individual identification number of the DCM 1, an ICCID (Integrated Circuit Card ID) that is identification information on the owner profile of the vehicle 10, and authentication information that is used for authentication by the communication system 2. The authentication information that is used for authentication by the communication system 2 is a public key and a private key for AKA authentication, for example.

The authentication information generation applet 152 is a program for generating the authentication information 153 with the profile information 151 as a key. For example, the authentication information 153 is a public key and a private key that are used for TLS authentication that is adopted by the server 4. The personal identification certificate 154 is an electronic certificate that is issued by the certificate authority 5 in relation to the authentication information 153. In the case where the authentication information 153 includes a public key and a private key, the personal identification certificate 154 is an electronic certificate for the public key. The public key and the private key may collectively be referred to as key information. Additionally, FIG. 3 illustrates component elements according to the first embodiment in an extracted manner, and component elements included in the ISD-P for owner profile 15 are not limited to the structural elements illustrated in FIG. 3.

For example, the default profile information is stored in the ISD-P for default profile 14. For example, the default profile information includes an IMSI that is an individual identification number of the DCM 1, an ICCID that is identification information on the default profile information, and authentication information that is used for authentication by the communication system 2. Additionally, the IMSI, the ICCID, and the like take different values between the ISD-P for default profile 14 and the ISD-P for owner profile 15. In the case where the vehicle 10 is to receive the service of the server 4 while being on sale, authentication information to be used for authentication by the server 4 and an electronic certificate certifying that the authentication information is for the administrator of the communication system 2 (manufacturer of the vehicle 10) may be stored in the ISD-P for default profile 14. In the case where the authentication information is generated by an applet, the applet may also be stored in the ISD-P for default profile 14. A generation algorithm of the applet for the authentication information may be the same or different from that of the authentication information generation applet 152. However, a format of the authentication information that is generated is the same regardless of the generation algorithm.

Additionally, the functional configuration of the DCM 1 illustrated in FIG. 3 is an example, and the functional configuration of the DCM 1 is not limited to the example illustrated in FIG. 3.

Figure 4:
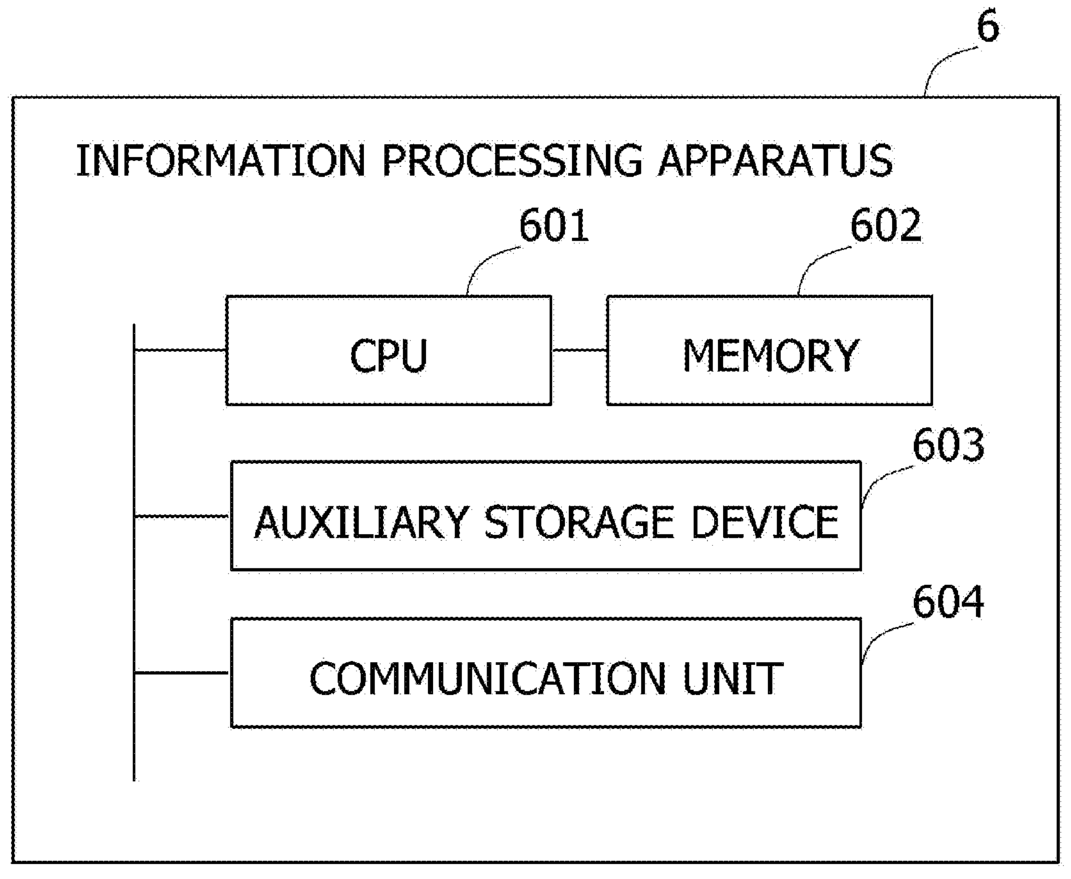
FIG. 4 is a diagram illustrating an example hardware configuration of an information processing apparatus.

FIG. 4 is a diagram illustrating an example hardware configuration of an information processing apparatus 6. The information processing apparatus 6 is an example of an apparatus that operates as one of the HSS 21, the AAA 22, the SM-DP+3, and the server 4. For example, the information processing apparatus 6 is a computer or an apparatus dedicated to the HSS 21, the AAA 22, the SM-DP+3, or the server 4.

As hardware components, the information processing apparatus 6 includes a processor 601, a memory 602, an auxiliary storage device 603, and a communication unit 604. The processor 601, the memory 602, the auxiliary storage device 603, and the communication unit 604 are electrically connected by a bus. The memory 602 and the auxiliary storage device 603 are the similar as the memory 102 and the auxiliary storage device 103, respectively. The auxiliary storage device 603 stores a program for implementing an operation of any of the HSS 21, the AAA 22, the SM-DP+3, and the server 4 that is to be achieved by the information processing apparatus 6.

The processor 601 performs various processes by loading, into the memory 602, and executing an OS and various other programs held in the auxiliary storage device 603. The processor 601 is a CPU, a DSP, and a GPU (Graphics Processing Unit), for example. The number of processors 601 is not limited to one, and may be more than one. In the case where there are a plurality of processors 601, the plurality of processors 601 may be processors of different types.

The communication unit 604 is an NIC (Network Interface Card) or an optical line interface, for example. Additionally, the communication unit 604 may be a wireless communication circuit for connecting to a wireless network such as a wireless LAN, for example. Additionally, the hardware configuration of the information processing apparatus 6 is not limited to the one illustrated in FIG. 4.

Figure 5:
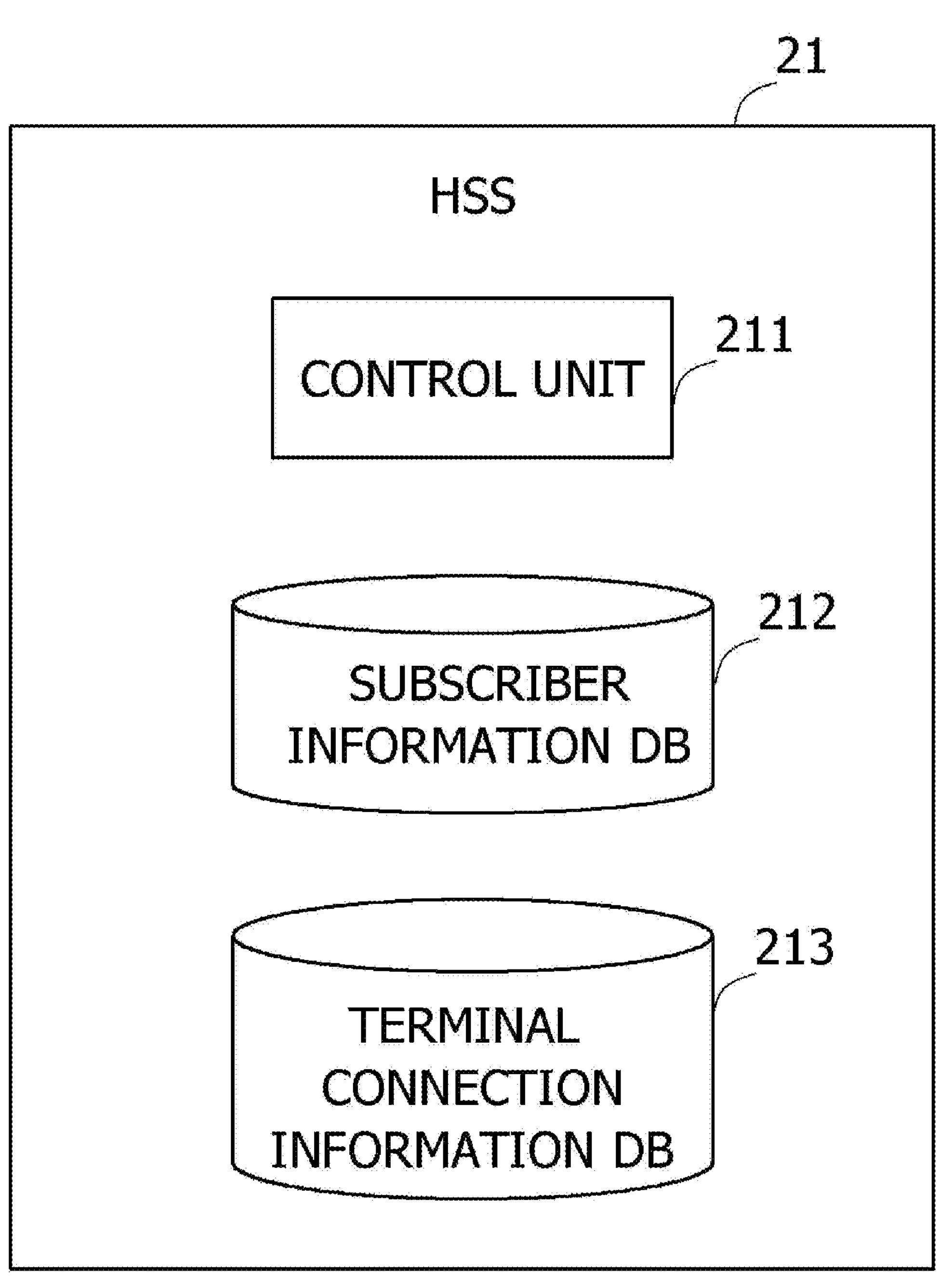
FIG. 5 is a diagram illustrating an example functional configuration of a HSS.

FIG. 5 is a diagram illustrating an example functional configuration of the HSS 21. As functional components, the HSS 21 includes a control unit 211, a subscriber information DB 212, and a terminal connection information DB 213. For example, in response to a request from the AAA 22, the control unit 211 reads data from the subscriber information DB 212 or the terminal connection information DB 213, or writes data into the subscriber information DB 212 or the terminal connection information DB 213.

The subscriber information DB 212 holds the subscriber information. The terminal connection information DB 213 holds information about a terminal that is connected to the communication system 2. Additionally, the functional configuration of the HSS 21 is not limited to the one illustrated in FIG. 5.

FIG. 6 is a diagram illustrating an example of information that is held in the subscriber information DB 212. One record in the subscriber information DB 212 illustrated in FIG. 6 includes fields of subscriber ID, vehicle ID, SIM ID, profile ID, matching ID, default, authentication information, and settings information.

An IMSI that is assigned by the communication system 2 to a subscriber of services of the communication system 2 is stored in the field of subscriber ID. In the first embodiment, the subscriber is the administrator of the communication system 2 in the case of the default profile, and the subscriber is the owner of the vehicle 10 (a person who signed a contract for services of the communication system 2) in the case of the owner profile.

An IMEI (International Mobile Equipment Identity) that is identification information on the DCM 1 assigned by the manufacturer of the DCM 1 is stored in the field of vehicle ID. Additionally, the manufacturer of the vehicle 10 and the manufacturer of the DCM 1 are possibly different. An EID (Embedded Identity Document) that is an identification number of the SIM assigned to the eUICC or the UICC is stored in the field of SIM ID.

An ICCID that is the identification information on the profile information is stored in the field of profile ID. A matching ID assigned to the profile information is stored in the field of matching ID. The matching ID is identification information for identifying the profile package at the SM-DP+3. Information indicating whether the profile information is the default profile or not is stored in the field of default. The information indicating whether the profile information is the default profile or not is a flag, for example. Authentication information that is used for authentication of the DCM 1 is stored in the field of authentication information. For example, in the case where the authentication scheme adopted by the AAA 22 is AKA authentication, the public key and the private key corresponding to the DCM 1 are stored in the field of authentication information.

Contents set in the profile are stored in the field of settings information. For example, the settings information on a profile includes contents of the contract with the subscriber, and policy information. In the case where the communication system 2 is MVNO, the settings information includes a billing destination of the communication fee, a billing rule, and the like. In the case of the default profile, the billing destination of the communication fee is the administrator of the communication system 2 (manufacturer of the vehicle 10). In the case of the owner profile, the billing destination of the communication fee is the owner of the vehicle 10.

Information that is held in the subscriber information DB 212 is input from an operator terminal of the communication system 2, for example. Additionally, information that is held in the subscriber information DB 212 is not limited to the example illustrated in FIG. 6.

FIG. 7 is a diagram illustrating an example of information that is held in the terminal connection information DB 213. Information about connection of the DCM 1 that is connected to the communication system 2 is stored in the terminal connection information DB 213. One record in the terminal connection information DB 213 illustrated in FIG. 7 includes fields of subscriber ID, vehicle ID, authentication date/time, and profile ID.

As in the case of the fields of subscriber ID and vehicle ID in the subscriber information DB 212, the IMSI and the IMEI are stored in the fields of subscriber ID and vehicle ID, respectively. Date/time of authentication of the DCM 1 by the AAA 22 is stored in authentication date/time. Identification information (ICCID) of the profile information used for authentication by the AAA 22 is stored in the field of profile ID. A record in the terminal connection information DB 213 is generated when the DCM 1 is newly connected to the communication system 2, and is deleted when communication with the DCM 1 is cut off.

In the case where the ICCID in the field of profile ID in the record in the terminal connection information DB 213 is indicated to correspond to the default profile in the subscriber information DB 212, it can be identified that the corresponding vehicle is currently on sale as a new or used vehicle. Additionally, information that is held in the terminal connection information DB 213 is not limited to the information illustrated in FIG. 7. Furthermore, in the first embodiment, an example is described where management is performed in such a way that the subscriber information DB 212 holds information that is not changed depending on a connection state of the DCM 1, and the terminal connection information DB 213 holds information that is dynamically changed depending on the connection state of the DCM 1, but such a case is not restrictive. The information that is held in the subscriber information DB 212 and the information that is held in the terminal connection information DB 213 may be integrated and managed as one database.

Figure 8:
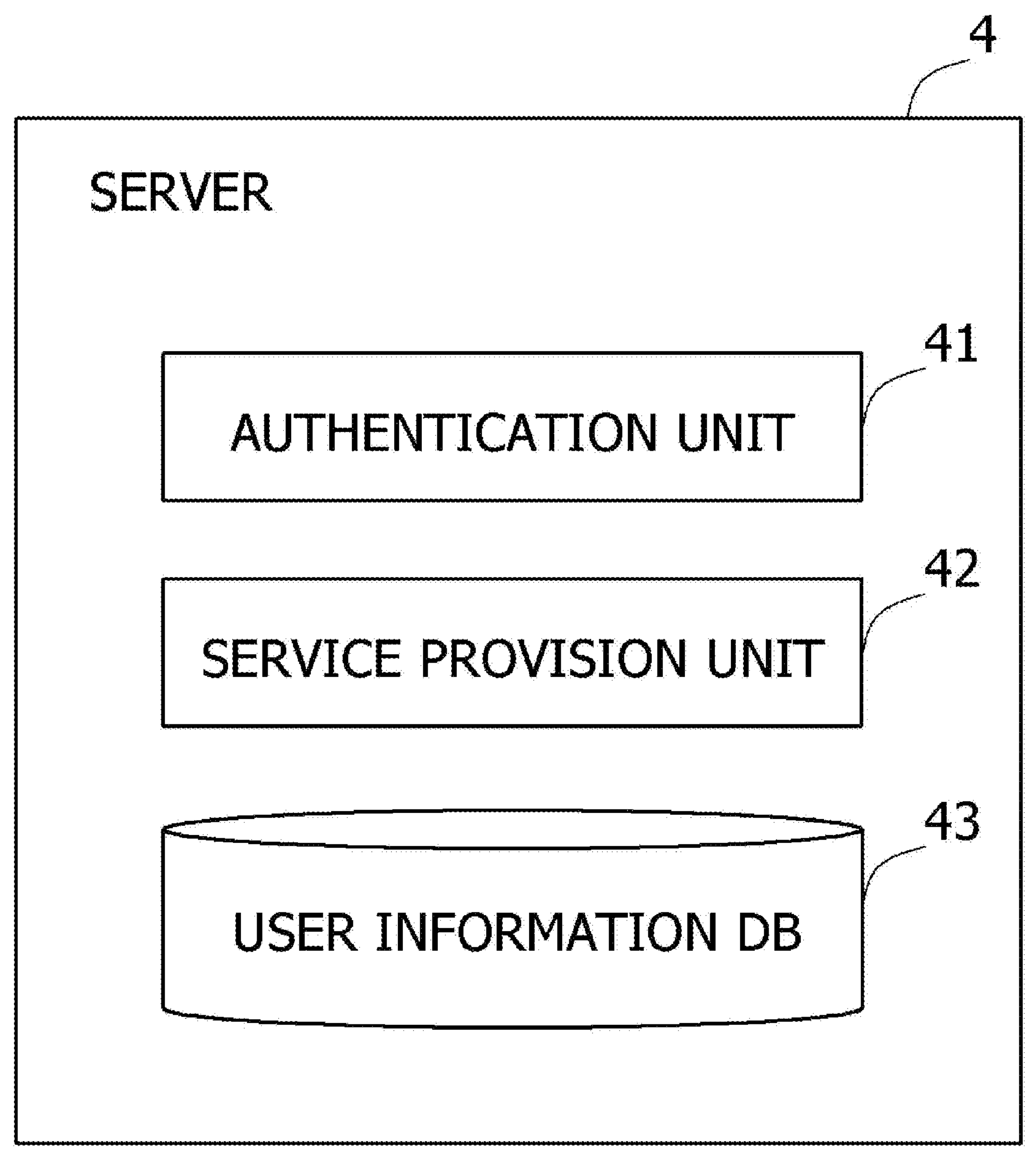
FIG. 8 is a diagram illustrating an example functional configuration of a server.

FIG. 8 is a diagram illustrating an example functional configuration of the server 4. As functional components, the server 4 includes an authentication unit 41, a service provision unit 42, and a user information DB 43. The authentication unit 41 performs authentication of the DCM 1 by a predetermined authentication scheme (such as TLS authentication). The authentication unit 41 permits access to the server 4 by receiving the personal identification certificate 154 from the DCM 1. The service provision unit 42 performs a process related to a service matching the DCM 1.

The user information DB 43 stores information about a user of the service that is provided by the server 4. For example, information about the user includes identification information on the user, authentication information that is used for authentication of the user, personal information on the user, and details of service matching the personal information on the user. For example, the identification information (IMSI) of the subscriber of the communication system 2 is used as the identification information on the user.

The personal identification certificate 154 is corresponding to the authentication information that is generated by using the profile information. The profile information includes the identification information (IMSI) that allows identification of the owner of the vehicle 10. The service provision unit 42 is able to identify the owner of the vehicle 10 based on the personal identification certificate 154 used for authentication, and to provide a service matching an attribute of the owner of the vehicle 10. Additionally, for example, information in a database held by the communication system 2 may be used as a part of information held in the user information DB 43, such as personal information on the user. Additionally, the functional configuration of the server 4 is not limited to the one illustrated in FIG. 8.

<Flow of Processes>

Figure 9:
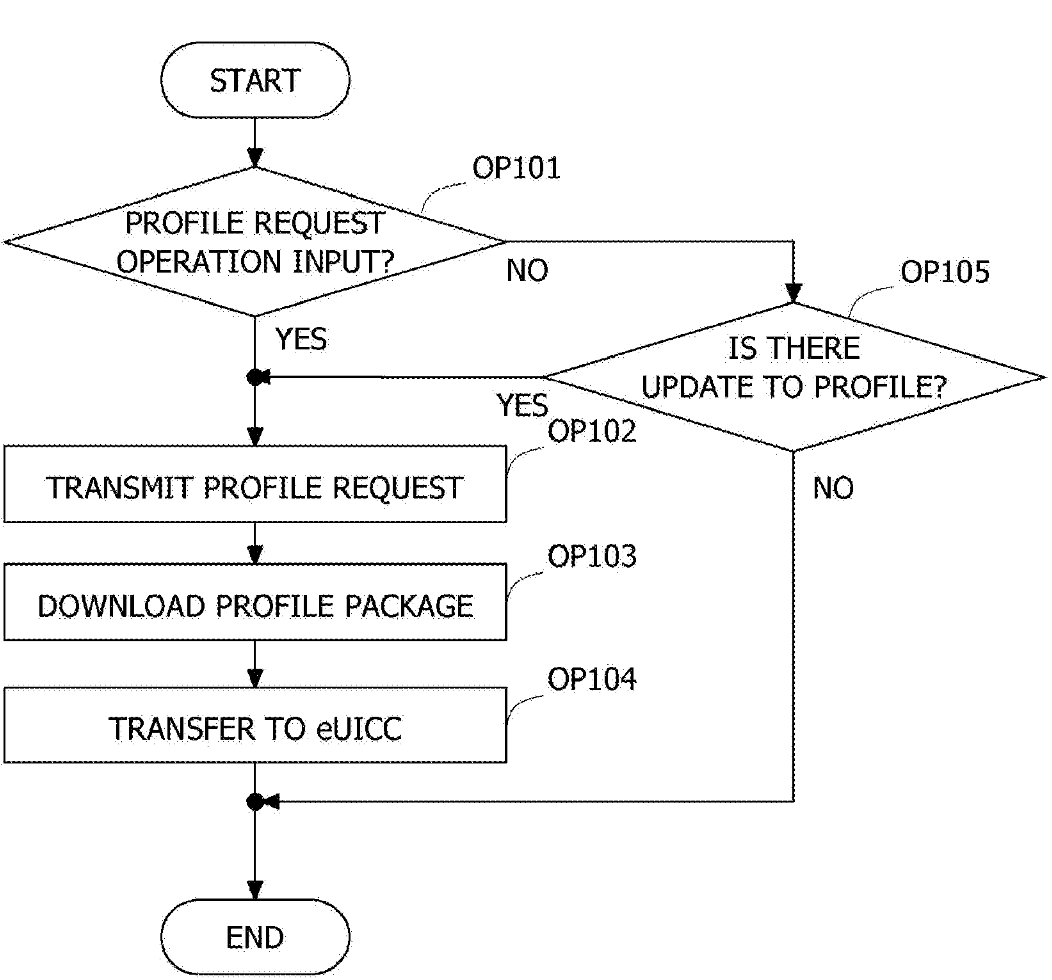
FIG. 9 is an example of a flowchart of a download process for profile information that is performed by the DCM.

FIG. 9 is an example of a flowchart of a download process for profile information that is performed by the DCM 1. The process illustrated in FIG. 9 is repeatedly performed during operation of the DCM 1. A main performer of the process illustrated in FIG. 9 is the CPU 101 of the DCM 1, but a functional element is described as the main performer for the sake of convenience. The same applies to flowcharts following FIG. 9.

In OP101, the LPAd 12 determines whether a user operation for requesting acquisition of a profile is input or not. For example, when a contract to subscribe to the service of the communication system 2 is signed, a QR code (registered trademark) including an activation code for downloading the owner profile from the communication system 2 is notified to the DCM 1. Regarding a notification method of the QR code, notification may be performed through printing on paper, through access to a predetermined URL, or through transmission to a smartphone of the owner of the vehicle 10 by an email, for example. In the case where notification of the QR code is performed using paper or the smartphone of the owner of the vehicle 10, the owner of the vehicle 10 may input, to the DCM 1, the user operation for requesting acquisition of a profile, by reading the QR code by a vehicle-mounted camera or the like that is mounted on the vehicle 10 and connected to the DCM 1. In the case where notification of the QR code is performed in the form of digital data (such as image data) through access to a predetermined URL, the user operation for requesting acquisition of a profile may be input to the DCM 1 by the DCM 1 reading data of the QR code. The activation code is input together with the request. Additionally, the user operation for requesting acquisition of a profile is not limited to using the method that uses the QR code.

In the case where the user operation for requesting acquisition of a profile is input (OP101: YES), the process proceeds to OP102. In the case where the user operation for requesting acquisition of a profile is not input (OP101: NO), the process proceeds to OP105.

In OP102, the LPAd 12 transmits, to the SM-DP+3, a profile request requesting acquisition of profile information. In the case where the QR code is used, the activation code is transmitted together with the profile request. The activation code includes an address of the SM-DP+3 and the matching ID, for example.

In OP103, the LPAd 12 downloads the profile package from the SM-DP+3. In OP104, the LPAd 12 transfers the downloaded profile package to the ISD-R 13. Then, the process illustrated in FIG. 9 is ended.

In OP105, the LPAd 12 determines whether there is an update to the profile information held in the ISD-P for owner profile 15. An update to the profile information occurs when vulnerability is found in the authentication information included in the profile information 151 or the authentication information 153, or when an algorithm of the authentication information generation applet 152 is updated, for example. Furthermore, an update to the profile information is detected by the ISD-R 13, and notified to the LPAd 12. In the case where there is an update to the profile information held in the ISD-P for owner profile 15 (OP105: YES), the process proceeds to OP102.

Additionally, update of the profile information is performed on a per package basis. Accordingly, a profile package including the profile information after update is downloaded from the SM-DP+3, and an ISD-P corresponding to the profile information after update is newly created. The ISD-P corresponding to the profile information before update is disabled due to the ISD-P corresponding to the profile information after update being enabled. Accordingly, the matching ID of the profile package is changed from the one before update. The matching ID of the profile package including the profile information after update is acquired by the ISD-R 13 from the SM-DP+3 together with detection of the update to the profile information, for example. However, it is not limited for update of the profile information to be performed on a per package basis, and the update of the profile information may be performed on a per profile information basis or on a per applet basis when there is update. In the case where update of the profile information is performed on a per profile information basis or on a per applet basis, the profile information or applet after update may be downloaded from the SM-DP+3 and be stored in the corresponding ISD-P. Additionally, the download process for profile information is not limited to the process illustrated in FIG. 9, and may be changed as appropriate according to the embodiment.

Figure 10:
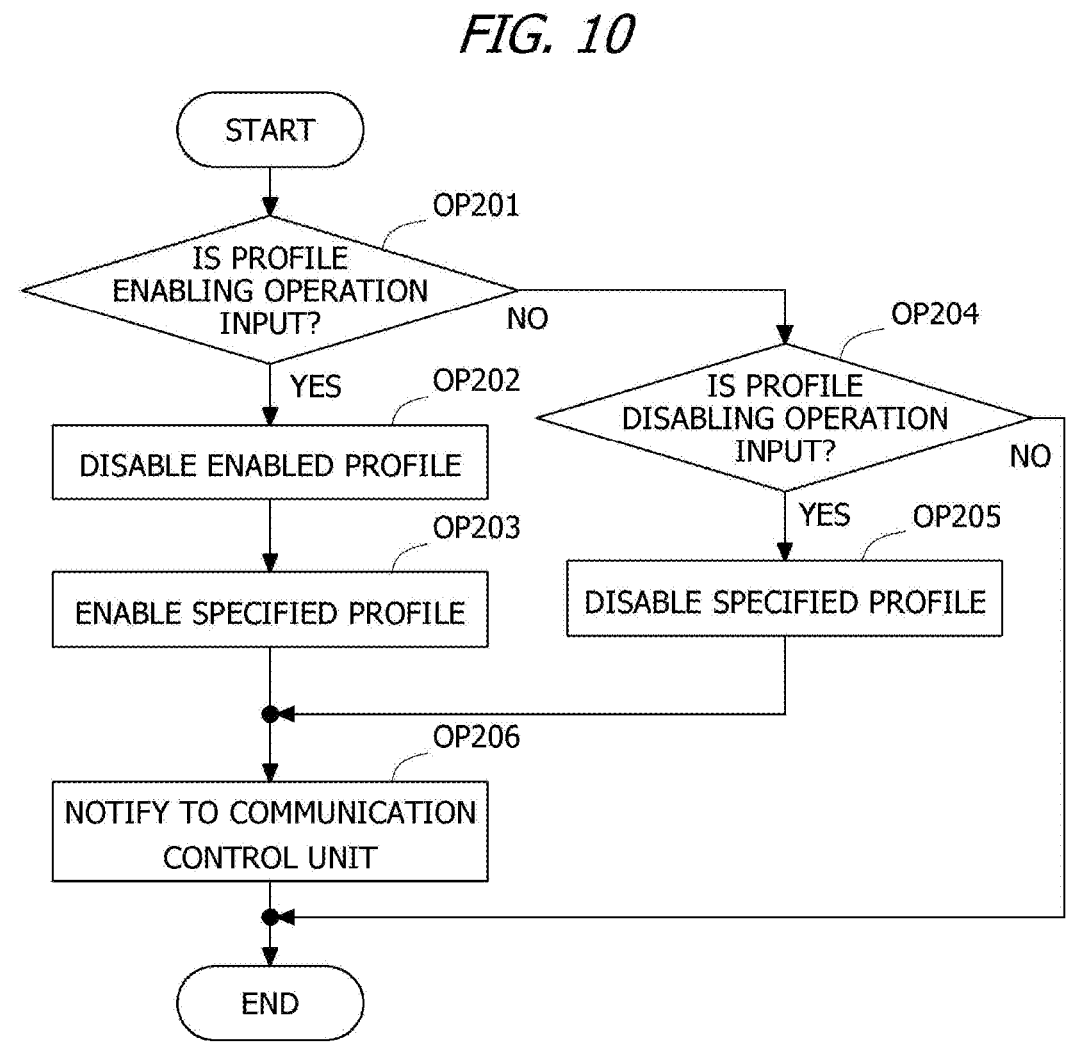

FIG. 10 is an example of a flowchart of a process of enabling or disabling a profile that is performed by the DCM 1. The process illustrated in FIG. 10 is repeatedly performed every predetermined period during operation of the DCM 1.

In OP201, the LPAd 12 determines whether a user operation for enabling a profile is input or not. Additionally, a user operation for enabling or disabling a profile is input from a menu screen related to the SIM, for example. In the case where a user operation for enabling a profile is input (OP201: YES), the process proceeds to OP202. In OP202, the LPAd 12 notifies the ISD-R 13 of the instruction to enable a profile, and in the case where there is a profile that is currently enabled, the ISD-R 13 disables the profile. In the case where there is no profile that is currently enabled, the process in OP202 is skipped. In OP203, the ISD-R 13 enables the profile (ISD-P), enabling of which is specified.

In the case where there is no input of the user operation for enabling a profile (OP201: NO), the process proceeds to OP204. In OP204, the LPAd 12 determines whether a user operation for disabling a profile is input or not. In the case where a user operation for disabling a profile is input (OP204: YES), the process proceeds to OP205. In the case where neither the user operation for enabling a profile nor the user operation for disabling a profile is input (OP204: NO), the process illustrated in FIG. 10 is ended. In OP205, the LPAd 12 notifies the ISD-R 13 of the instruction to disable a profile, and the ISD-R 13 disables the profile (ISD-P), disabling of which is specified.

In OP206, because the profile that is enabled or disabled is changed, the LPAd 12 notifies the communication control unit 11 of the change of the enabled profile or disabling of all profiles. In the case where the profile that is enabled is changed, the communication control unit 11 re-connects communication to the communication system 2 by using the profile information that is newly enabled. In the case where the profile information is disabled and there is no profile that is enabled, communication with the communication system 2 is cut off. Then, the process illustrated in FIG. 10 is ended.

For example, at the time of shipping of the vehicle 10 from the factory, an operation for enabling the default profile is input by staff (OP201: YES), and the default profile is enabled (OP203). For example, in the case where the vehicle 10 is purchased and a new owner downloads the owner profile from the SM-DP+3 in preparation for connection of the DCM 1 to the communication system 2, a user operation for enabling the owner profile is input by the owner of the vehicle 10 (OP201: YES). In this case, because the default profile is enabled, the default profile is disabled (OP202), and then, the owner profile is enabled (OP203).

For example, in the case where the vehicle 10 is sold by the owner to a secondhand dealer and is put on sale as a used vehicle, a user operation for enabling the default profile is input (OP201: YES) by the owner of the vehicle 10 or staff of the secondhand dealer to disable the owner profile. In this case, first, the owner profile that is enabled is disabled (OP202), and then, the default profile is enabled (OP203). Additionally, when the owner profile is disabled, the authentication information 153 and the personal identification certificate 154 in the ISD-P for owner profile 15 are also disabled.

Additionally, the process of enabling or disabling a profile is not limited to the example illustrated in FIG. 10. Additionally, in the case where the vehicle 10 is sold by the owner to a secondhand dealer, the owner profile may be deleted from the eUICC 105.

Figure 11:
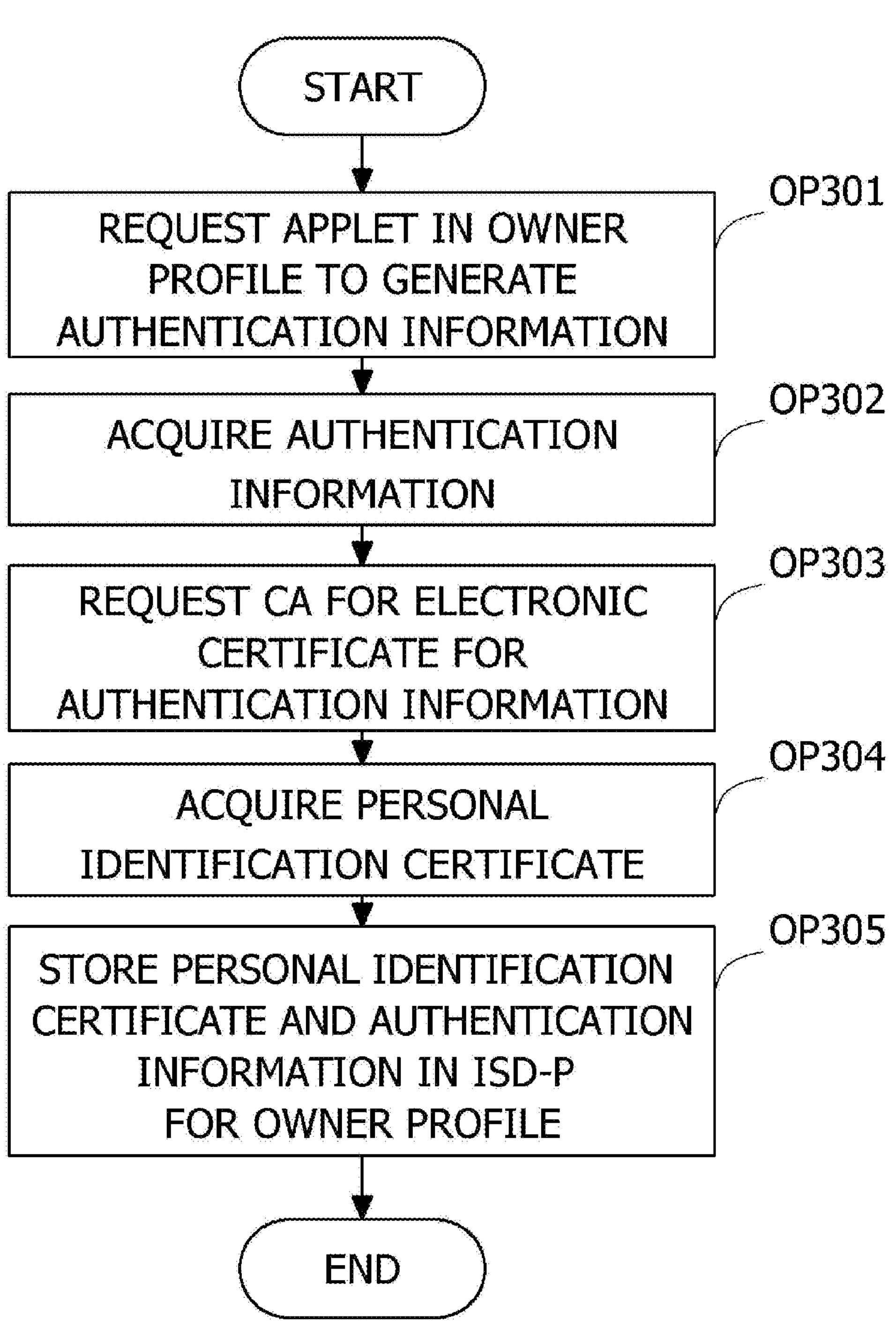
FIG. 11 is an example of a flowchart of a process for acquiring the personal identification certificate that is performed by the DCM.

FIG. 11 is an example of a flowchart of a process for acquiring the personal identification certificate 154 that is performed by the DCM 1. For example, the process illustrated in FIG. 11 is started by obtaining a permission from a user to acquire the personal identification certificate 154 in a case where, at a time of access to the server 4 by the service control unit 16, the personal identification certificate 154 is not stored in the ISD-P for owner profile 15 or the personal identification certificate 154 in the ISD-P for owner profile 15 is expired, for example. A case where the personal identification certificate 154 is not stored in the ISD-P for owner profile 15 is a case where access to the server 4 is not performed after download of the owner profile from the SM-DP+3 or after update of the owner profile, for example.

In OP301, the service control unit 16 requests the LPAd 12 for generation of the authentication information 153 by the authentication information generation applet 152. In OP302, the authentication information generation applet 152 is started by the LPAd 12 through the ISD-R 13, the authentication information 153 is generated, and the service control unit 16 acquires the authentication information 153. In OP303, the service control unit 16 transmits, to the certificate authority 5, a request for issuance of an electronic certificate for the authentication information 153. A part (for example, the public key) or all of the authentication information 153 is transmitted together with the request.

In OP304, the service control unit 16 acquires the personal identification certificate 154 from the certificate authority 5. In OP305, the service control unit 16 stores the authentication information 153 and the personal identification certificate 154 in the ISD-P for owner profile 15. Then, the process illustrated in FIG. 11 is ended. The service control unit 16 transmits the personal identification certificate 154 to the server 4 and performs the authentication process with the server 4 by using the authentication information 153, and starts using the service of the server 4. Additionally, the process for acquiring the personal identification certificate 154 is not limited to the example illustrated in FIG. 11.

Figure 12:
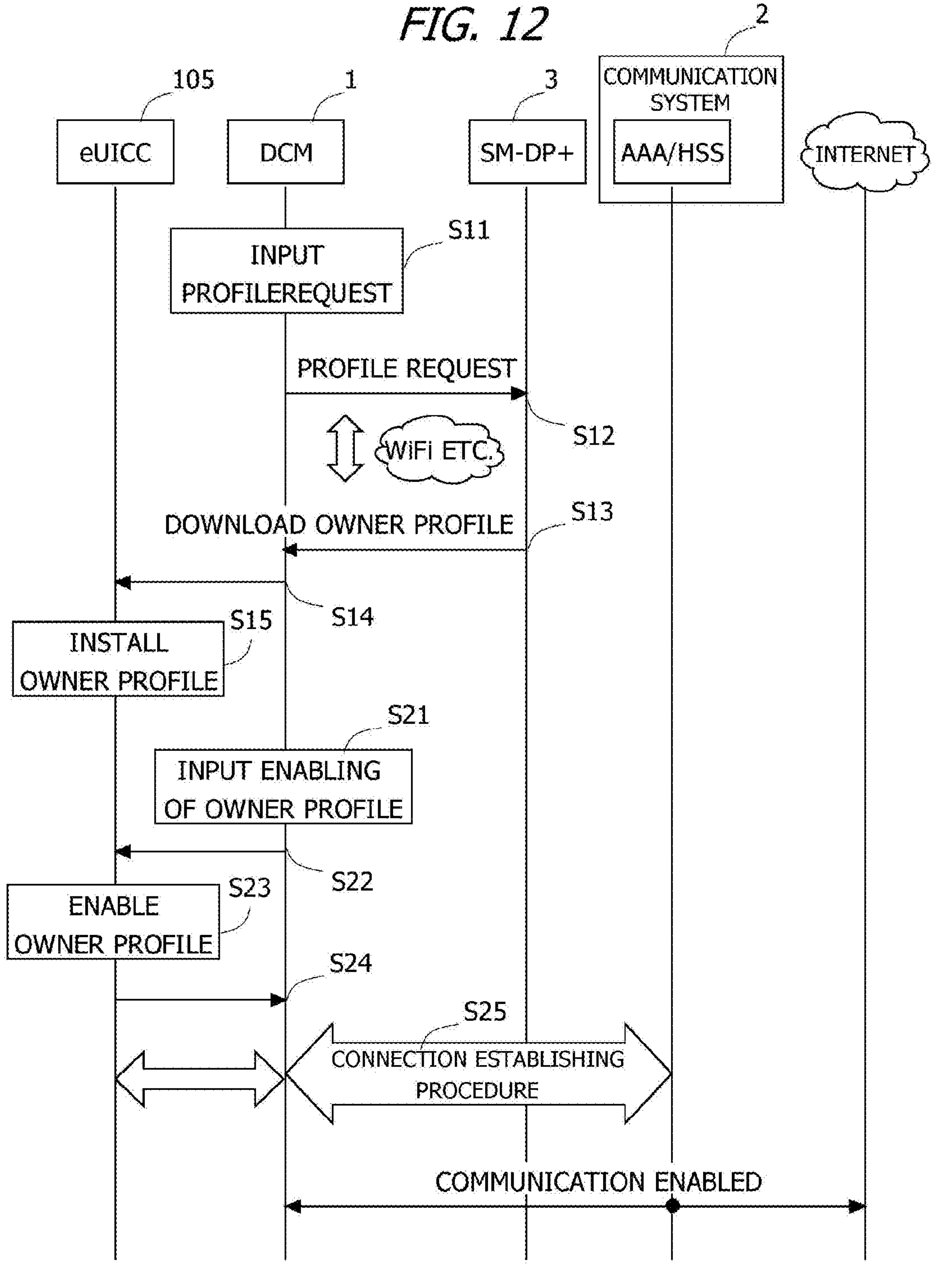
FIG. 12 is a diagram illustrating an example of a sequence of processes from when the DCM acquires the owner profile to when the DCM connects to the communication system.

FIG. 12 is a diagram illustrating an example of a sequence of processes from when the DCM 1 acquires the owner profile to when the DCM 1 connects to the communication system 2. As a premise for the sequence of processes illustrated in FIG. 12, the default profile is stored in the eUICC 105, and the default profile is enabled.

In S11, the DCM 1 receives, from the owner of the vehicle 10, input of a user operation for requesting for the owner profile (FIG. 9, OP101: YES). In S12, the DCM 1 transmits the profile request to the SM-DP+3 (FIG. 9, OP102). In S13, the DCM 1 downloads the package of the owner profile from the SM-DP+3 (FIG. 9, OP103). Communication between the DCM 1 and the SM-DP+3 in S12 and S13 is performed via WiFi, for example. In 514, the DCM 1 transfers the package of the owner profile that is downloaded to the eUICC 105 (FIG. 9, OP104). In S15, the ISD-P for owner profile 15 is created from the package of the owner profile by the ISD-R 13 in the eUICC 105, and the owner profile is installed.

In S21, a user operation for enabling the owner profile is input to the DCM 1 by the owner of the vehicle 10 (OP201: YES). In S22, an instruction to enable the owner profile is issued from the DCM 1 to the ISD-R 13 in the eUICC 105. In S23, the default profile that is currently enabled is disabled (OP202), and then, the owner profile is enabled (OP204). In S24, the DCM 1 is notified that the owner profile is newly enabled (OP206).

In S25, the DCM 1 performs a procedure of establishing connection to the communication system 2 by using the owner profile information. A process of authentication using the owner profile information is performed between the DCM 1 and the HSS 21 during a series of processes by the AAA 22 (AKA authentication). When communication is established between the DCM 1 and the communication system 2, the DCM 1 is enabled to perform communication with an external network such as the Internet via the communication system 2.

Figure 13:
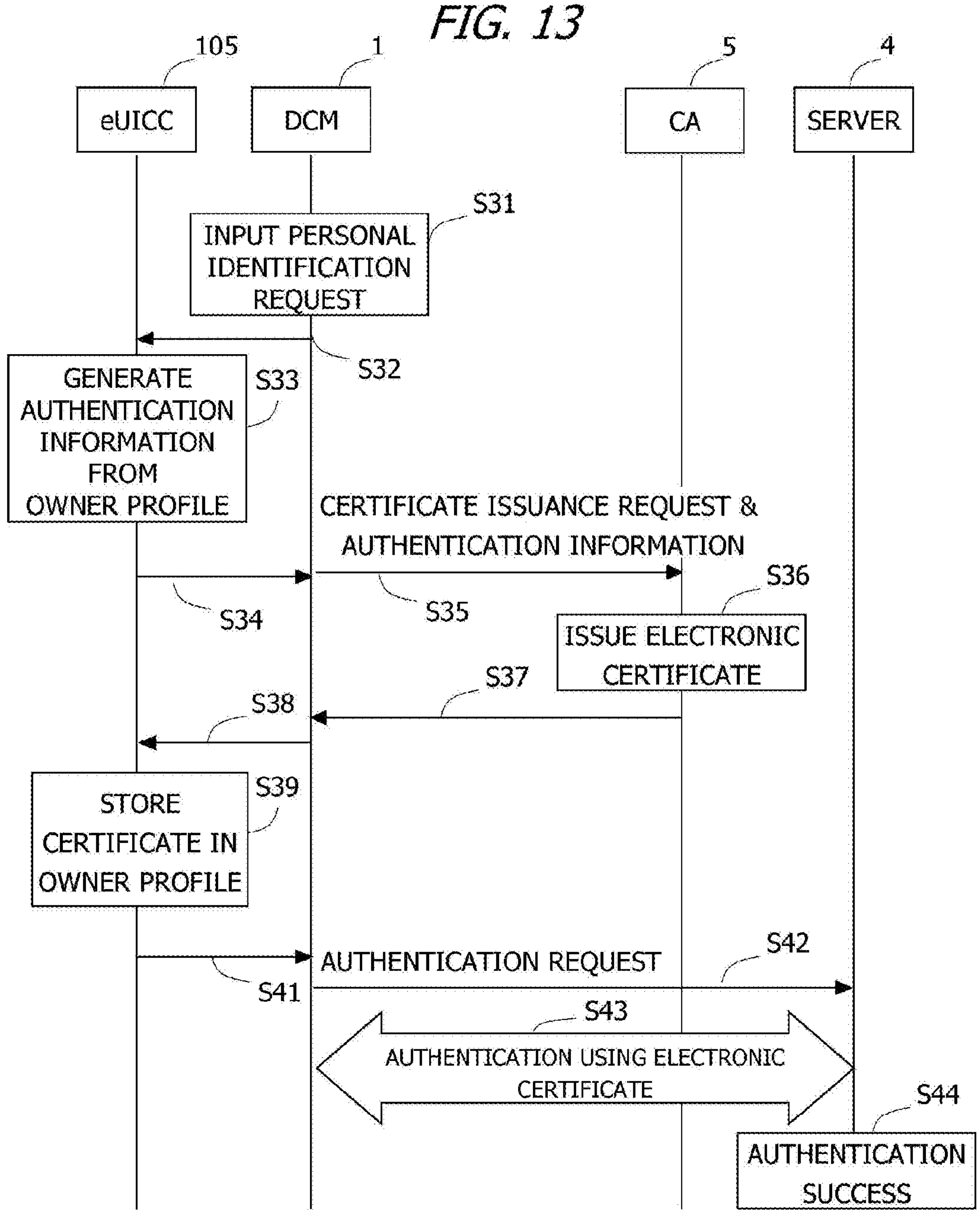
FIG. 13 is a diagram illustrating an example of a sequence of processes from when the DCM acquires the personal identification certificate to when the DCM accesses the server.

FIG. 13 is a diagram illustrating an example of a sequence of processes from when the DCM 1 acquires the personal identification certificate 154 to when the DCM 1 accesses the server 4. For example, as a premise for the sequence of processes illustrated in FIG. 13, the sequence illustrated in FIG. 12 is performed, and the DCM 1 is already connected to the communication system 2 using the owner profile.

In S31, the DCM 1 receives, from a user (for example, the owner of the vehicle 10), input of a user operation for requesting acquisition of the personal identification certificate 154 (FIG. 11, OP301). For example, in the case where a user operation for starting service of the server 4 is input from the user and the personal identification certificate 154 is not held by the eUICC 105, a message or the like requesting permission to acquire the personal identification certificate 154 is output, and the user operation for requesting acquisition of the personal identification certificate 154 is input when permitted by the user.

In S32, the DCM 1 instructs the ISD-R 13 in the eUICC 105 to generate the authentication information 153. In S33, the authentication information 153 is generated by the authentication information generation applet 152 in the eUICC 105 by using the profile information 151. In S34, the DCM 1 acquires the authentication information 153 through the ISD-R 13 in the eUICC 105 (FIG. 11, OP302). In S35, the DCM 1 transmits, to the certificate authority 5, a request for issuance of an electronic certificate for the authentication information 153, and the authentication information 153 (for example, a public key) (FIG. 11, OP303). In S36, the certificate authority 5 issues the personal identification certificate 154. In S37, the DCM 1 receives the personal identification certificate 154 from the certificate authority 5 (FIG. 11, OP304). In S38, the DCM 1 transfers the personal identification certificate 154 to the eUICC 105. In S39, the ISD-R 13 in the eUICC 105 stores the personal identification certificate 154 and the authentication information 153 in the ISD-P for owner profile 15 (FIG. 11, OP305).

In S41, the DCM 1 reads the personal identification certificate 154 from the eUICC 105. In S42, the DCM 1 transmits an authentication request and the personal identification certificate 154 to the server 4. Then, the DCM 1 performs a process of authentication that uses the authentication information 153 with the server 4 (for example, TLS authentication). In S44, the server 4 authenticates the DCM 1, and starts providing a service to the DCM 1. The server 4 can identify the current owner of the vehicle 10 from the personal identification certificate 154, and can provide a service matching an attribute or the like of the owner of the vehicle 10, for example.

FIG. 14 is a diagram illustrating an example of change in the profile information that is used by the vehicle 10. At the time of shipping from the factory, the default profile is stored in the eUICC 105 and is enabled. Between shipping from the factory and purchase and signing of a contract to subscribe to services of the communication system 2, the default profile is enabled (Enable), and the DCM 1 connects to the communication system 2 using the default profile. Information about the default profile is registered in the HSS 21 of the communication system 2 (for example, see FIG. 6).

When a contract to subscribe to services of the communication system 2 is signed, an owner A profile is downloaded and enabled. Accordingly, the default profile is disabled (Disable). Between signing of a contract to services of the communication system 2 and sale, the DCM 1 connects to the communication system 2 by using the owner A profile. After the owner A profile is enabled, the personal identification certificate 154 is acquired. Information about the owner A and information about the owner A profile are registered in the HSS 21 of the communication system 2 (for example, see FIG. 6). Additionally, information about the default profile is to remain in the HSS 21.

When the vehicle 10 is sold to a secondhand dealer, the default profile is enabled, and the owner A profile is disabled. Accordingly, the personal identification certificate 154 in the ISD-P for owner profile 15 is also disabled. Furthermore, the contract signed by the owner of the vehicle 10 for services of the communication system 2 is cancelled, and thus, information about the owner A and information about the owner A profile are deleted from the HSS 21 of the communication system 2. Thereafter, the DCM 1 connects to the communication system 2 by using the default profile until the vehicle 10 is purchased and a contract to subscribe to services of the communication system 2 is signed by a new owner.

When the vehicle 10 is purchased again, and a contract to subscribe to services of the communication system 2 is signed by a new purchaser B, an owner B profile is downloaded and enabled, and the default profile is disabled. Thereafter, the DCM 1 connects to the communication system 2 by using the owner B profile. After the owner B profile is enabled, the personal identification certificate 154 corresponding to the owner B profile is acquired. Information about the owner B and information about the owner B profile are registered in the HSS 21 of the communication system 2 (for example, see FIG. 6).

Operations and Effects of First Embodiment

In the first embodiment, the personal identification certificate 154 is generated from the profile information 151 and is held in the ISD-P for owner profile 15, and thus, as illustrated in FIG. 14, the owner profile information and the ISD-P for owner profile 15 are also changed when the owner of the vehicle 10 is changed. The server 4 that performs authentication using the personal identification certificate 154 may identify the new owner based on the personal identification certificate 154 even when the owner of the vehicle 10 is changed. Accordingly, the server 4 is able to provide a service matching an attribute or the like of the current owner of the vehicle 10, for example.

Furthermore, in the first embodiment, as illustrated in FIG. 14, in a case where the vehicle 10 is not owned by a specific individual, or in other words, even when the vehicle 10 is being sold as a new vehicle or a used vehicle, the DCM 1 can connect to the communication system 2 by using the default profile. Accordingly, the communication system 2 is able to collect information about communication of the vehicle 10 and perform control even when the vehicle 10 is being sold as a new vehicle or a used vehicle.

Furthermore, in the first embodiment, the owner profile is updated and the personal identification certificate 154 is also updated due not only to change of the owner but also to a reason such as detection of vulnerability in the personal identification certificate 154 or the owner profile. Accordingly, vulnerability in the personal identification certificate 154 or the owner profile can be covered, and security can be increased.

Other Embodiments

The embodiments described above are examples, and the present disclosure may be changed and carried out as appropriate without departing from the gist of the present disclosure.

In the first embodiment, the communication system 2 is assumed to be a system that is compatible with 4G. However, such a case is not restrictive, and the communication system 2 may be a system that is compatible with a 5G, 3G, 6G or later mobile communication scheme. In the case where the communication system 2 is compatible with 5G, the communication system 2 includes UDM (Unified Data Management) instead of the HSS, for example.

In the first embodiment, an example is described where the communication system 2 is a system that is managed by the manufacturer of the vehicle 10 and that performs control and collection of information related to communication of the vehicle 10, but an application target of the technology described in the first embodiment is not limited to the vehicle 10 and the communication system 2. For example, application is also possible to a communication terminal or an IoT terminal, such as a smartphone, and a communication system of a manufacturer thereof. Furthermore, the administrator of the communication system 2 may receive, from a third party, a request to collect information about communication of the subscriber of services of the communication system 2, collect information about communication of a terminal that is connected to the communication system 2, and provide the same to the third party. In this case, the billing destination of the communication fee in a case where the default profile is used is the third party.

The processes and means described in the present disclosure may be freely combined to the extent that no technical conflict exists.

A process which is described to be performed by one device may be performed among a plurality of devices. Processes described to be performed by different devices may be performed by one device. Each function to be implemented by a hardware component (server component) in a computer system may be flexibly changed.

The present disclosure may also be implemented by supplying a computer program for implementing a function described in the embodiment above to a computer, and by reading and executing the program by at least one processor of the computer. Such a computer program may be provided to a computer by a non-transitory computer-readable storage medium which is connectable to a system bus of a computer, or may be provided to a computer through a network. The non-transitory computer-readable storage medium may be any type of disk such as a magnetic disk (floppy (registered trademark) disk, a hard disk drive (HDD), etc.), an optical disk (CD-ROM, DVD disk, Blu-ray disk, etc.), a read only memory (ROM), a random access memory (RAM), an EPROM, an EEPROM, a magnetic card, a flash memory, an optical card, and any type of medium which is suitable for storing electronic instructions.

What is claimed is:

1. An information processing apparatus comprising:

an eUICC (Embedded Universal Integrated Circuit Card) that holds first profile information that is used for connection to a first communication system and that is associated with a first owner of the information processing apparatus;

an applet configured to generate first authentication information with the first profile information as a key; and a processor configured to connect to the first communication system by using the first profile information, wherein the processor is further configured to acquire, from a second server that manages profile information, the first profile information and the applet;

store the first profile information and the applet in the eUICC;

start the applet, and cause the applet to generate the first authentication information:

acquire, from a predetermined certificate authority, a first electronic certificate that certifies that the first authentication information is for the first owner, the first authentication information being used for authentication by a first server trusted by the first communication system and corresponding to the first profile information;

store the first authentication information and the first electronic certificate in the eUICC; and receive authentication by the first server by using the first authentication information and the first electronic certificate, and wherein, in a case where the applet is updated, the processor is configured to acquire, from the second server, at least updated applet;

store the updated applet in the eUICC;

start the updated applet, and cause the updated applet to newly generate the first authentication information;

acquire, from the predetermined certificate authority, the first electronic certificate in relation to the newly generated first authentication information; and store, in the eUICC, the newly generated first authentication information and the first electronic certificate that is newly acquired.

2. The information processing apparatus according to claim 1, wherein the processor is configured to acquire, from the predetermined certificate authority, in a case where second profile information that is newly held in the eUICC is enabled, a second electronic certificate that certifies that second authentication information corresponding to the second profile information is for a second owner, the second profile information being used for connection to the first communication system, and being associated with the second owner of the information processing apparatus, store the second authentication information and the second electronic certificate in the eUICC, and receive authentication by the first server by using the second authentication information and the second electronic certificate, and the first profile information and the first electronic certificate are disabled or deleted.

3. The information processing apparatus according to claim 1, wherein, after authentication by the first server, the first owner is identified by the first server based on the first electronic certificate, and the processor is configured to receive provision of a service with contents matching the first owner from the first server.

4. The information processing apparatus according to claim 1, wherein the eUICC does not hold the first profile information and holds default profile information that is used for connection to the first communication system, at a time of shipping from a factory, and the processor is configured to connect to the first communication system by enabling the default profile information, disable the default profile information and enable the first profile information, in a case where the first profile information is acquired from the second server that manages profile information and is stored in the eUICC, and disable or delete the first profile information and enable the default profile information, in a case where a predetermined secondhand dealer sells the information processing apparatus second hand.

5. The information processing apparatus according to claim 1, wherein the information processing apparatus is mounted on a vehicle, the first communication system is a system that is managed by a manufacturer of the vehicle, and the first profile information is issued by the first communication system in a case where the vehicle is purchased by the first owner.

6. A method executed by a computer, the computer including an eUICC (Embedded Universal Integrated Circuit Card) that holds first profile information that is used for connection to a first communication system and that is associated with a first owner of an information processing apparatus, and an applet configured to generate first authentication information with the first profile information as a key, the method comprising:

acquiring, from a second server that manages profile information, the first profile information and the applet;

storing the first profile information and the applet in the eUICC; and starting the applet, and causing the applet to generate the first authentication information;

connecting to the first communication system by using the first profile information;

acquiring, from a predetermined certificate authority, a first electronic certificate that certifies that first authentication information is for the first owner, the first authentication information being used for authentication by a first server trusted by the first communication system and corresponding to the first profile information;

storing the first authentication information and the first electronic certificate in the eUICC; and receiving authentication by the first server by using the first authentication information and the first electronic certificate, wherein, in a case where the applet is updated, the method further comprising:

acquiring, from the second server, at least updated applet;

storing the updated applet in the eUICC;

starting the updated applet, and causing the applet to newly generate the first authentication information;

acquiring, from the predetermined certificate authority, the first electronic certificate in relation to the newly generated first authentication information; and storing, in the eUICC, the newly generated first authentication information and the first electronic certificate that is newly acquired.

7. The method according to claim 6, further comprising acquiring, from the predetermined certificate authority, in a case where second profile information that is newly held in the eUICC is enabled, a second electronic certificate that certifies that second authentication information corresponding to the second profile information is for a second owner, the second profile information being used for connection to the first communication system, and being associated with the second owner of the information processing apparatus, storing the second authentication information and the second electronic certificate in the eUICC, and receiving authentication by the first server by using the second authentication information and the second electronic certificate, wherein the first profile information and the first electronic certificate are disabled or deleted.

8. The method according to claim 6, wherein the eUICC does not hold the first profile information and holds default profile information that is used for connection to the first communication system, at a time of shipping from a factory, and further comprising connecting to the first communication system by enabling the default profile information, disabling the default profile information and enabling the first profile information, in a case where the first profile information is acquired from the second server that manages profile information and is stored in the eUICC, and disabling or deleting the first profile information and enabling the default profile information, in a case where a predetermined secondhand dealer sells the information processing apparatus second hand.

9. The method according to claim 6, wherein the computer is mounted on a vehicle, the first communication system is a system that is managed by a manufacturer of the vehicle, and the first profile information is issued by the first communication system in a case where the vehicle is purchased by the first owner.

* * * * *